US008309656B2

(12) United States Patent
Vollenberg et al.

(10) Patent No.: US 8,309,656 B2
(45) Date of Patent: Nov. 13, 2012

(54) ELASTOMER BLENDS CONTAINING POLYCARBONATES AND COPOLYETHERESTERS DERIVED FROM POLYETHYLENE TEREPHTHALATE, METHOD OF MANUFACTURE, AND ARTICLES THEREFROM

(75) Inventors: Peter H. Vollenberg, Evansville, IN (US); Dhaval Shah, Evansville, IN (US); Kenneth F. Miller, Posey, IN (US)

(73) Assignee: Sabic Innovative Plastics IP B.V. (NL)

( * ) Notice: Subject to any disclaimer, the term of this patent is extended or adjusted under 35 U.S.C. 154(b) by 693 days.

(21) Appl. No.: 11/781,449

(22) Filed: Jul. 23, 2007

(65) Prior Publication Data

US 2008/0027167 A1 Jan. 31, 2008

Related U.S. Application Data

(60) Provisional application No. 60/820,468, filed on Jul. 26, 2006.

(51) Int. Cl.
*C08L 53/00* (2006.01)
*C08L 67/00* (2006.01)
*C08G 18/42* (2006.01)

(52) U.S. Cl. ...... 525/92 G; 524/505; 524/539; 525/92 R

(58) Field of Classification Search .................. 524/539
See application file for complete search history.

(56) References Cited

U.S. PATENT DOCUMENTS 2,465,319 A 3/1949 Whinfield et al.
2,720,502 A 10/1955 Caldwell et al.
2,727,881 A 12/1955 Caldwell et al.
2,822,348 A 2/1958 Haslam et al.
3,047,539 A 7/1962 Pengilly
3,635,895 A 1/1972 Kramer et al.
3,701,755 A 10/1972 Sumoto et al.
3,855,277 A * 12/1974 Fox .............................. 524/409
3,864,428 A 2/1975 Nakamura et al.
3,907,868 A 9/1975 Currie et al.
3,907,926 A 9/1975 Brown et al.
3,953,394 A 4/1976 Fox et al.
4,011,285 A 3/1977 Seymour et al.
4,096,156 A 6/1978 Freudenberger et al.
4,128,526 A 12/1978 Borman
4,140,670 A 2/1979 Charles et al.
4,154,775 A 5/1979 Axelrod
4,157,325 A 6/1979 Charles et al.
4,161,498 A * 7/1979 Bopp ........................... 525/439
4,184,997 A 1/1980 Wu
4,203,887 A 5/1980 Goedde et al.
4,264,487 A 4/1981 Fromuth et al.
4,355,155 A 10/1982 Nelsen
4,469,851 A 9/1984 Charles et al.
4,579,884 A 4/1986 Liu
4,598,117 A 7/1986 Liu et al.
4,609,680 A 9/1986 Fujita et al.
4,657,973 A 4/1987 Endo et al.
4,767,668 A 8/1988 Smith et al.
4,778,855 A 10/1988 Boutni et al.
4,857,604 A * 8/1989 Agarwal ....................... 525/439
4,992,506 A 2/1991 McCormick et al.
5,122,551 A 6/1992 Gallucci et al.
5,162,424 A 11/1992 de Boer et al.
5,221,704 A 6/1993 Shimotsuma et al.
5,266,601 A 11/1993 Kyber et al.
5,304,594 A 4/1994 Saitou
5,326,806 A 7/1994 Yokosima et al.
5,413,681 A 5/1995 Tustin et al.
5,451,611 A 9/1995 Chilukuri et al.
5,488,086 A * 1/1996 Umeda et al. .............. 525/92 A
5,559,159 A 9/1996 Sublett et al.
5,804,654 A 9/1998 Lo et al.
5,859,119 A 1/1999 Hoefflin
5,882,780 A * 3/1999 Yamamura et al. ........ 428/295.1
6,020,414 A 2/2000 Nelsen et al.
6,087,591 A 7/2000 Nguyen et al.
6,162,837 A 12/2000 Gerking et al.
6,255,371 B1 7/2001 Schlosser et al.
6,410,607 B1 6/2002 Ekart et al.

(Continued)

FOREIGN PATENT DOCUMENTS

EP 0135493 A1 3/1985
EP 0142336 A1 5/1985
EP 0237306 A2 9/1987
EP 0320651 A2 6/1989
EP 0683201 A1 11/1995
EP 0846729 A2 6/1998
EP 1437377 A1 7/2004
GB 1500577 2/1978
GB 2048285 A1 12/1980
JP 58141236 8/1983

(Continued)

OTHER PUBLICATIONS

Mansour et al.; "Depolymerization of Poly(ethylene terephthalate) Waste Using 1,4-Butanediol and Triethylene Glycol"; N.E. Journal of Elastomers and Plastics; 35; pp. 133-148; (2003).

(Continued)

*Primary Examiner* — Peter F Godenschwager
*Assistant Examiner* — David Karst
(74) *Attorney, Agent, or Firm* — Cantor Colburn LLP; Diderico van Eyl

(57) ABSTRACT

A composition comprising from 10 to 90 weight percent of a copolyetherester elastomer comprising: a modified, random polybutylene terephthalate copolymer block that is derived from a polyethylene terephthalate component selected from the group consisting of polyethylene terephthalate, polyethylene terephthalate copolymers, and combinations thereof; and that contains at least one residue derived from the polyethylene terephthalate component; and a polyalkylene oxide copolymer block that is derived from the polyethylene terephthalate component and a polyalkylene oxide glycol, and that contains polyalkylene oxide and at least one residue derived from the polyethylene terephthalate component; from 10 to 90 weight percent of a polycarbonate; and from 0 to 60 weight percent of a polyester.

28 Claims, No Drawings

U.S. PATENT DOCUMENTS

| | | | | |
|---|---|---|---|---|
| 6,476,158 | B1 | 11/2002 | England et al. | |
| 6,515,044 | B1 | 2/2003 | Idel et al. | |
| 6,569,957 | B2 * | 5/2003 | Williams et al. | 525/439 |
| 6,599,625 | B2 | 7/2003 | Goldfinger et al. | |
| 6,794,463 | B2 | 9/2004 | Aramaki et al. | |
| 6,849,684 | B2 | 2/2005 | Poppe et al. | |
| 6,887,909 | B2 | 5/2005 | Kawamura et al. | |
| 6,927,275 | B2 | 8/2005 | Hirokane et al. | |
| 7,179,869 | B2 | 2/2007 | Hirokane et al. | |
| 7,183,362 | B2 | 2/2007 | Hirokane et al. | |
| 7,388,067 | B2 | 6/2008 | Leemans et al. | |
| 2002/0012807 | A1 | 1/2002 | Kurian et al. | |
| 2004/0059084 | A1 | 3/2004 | Hirokane et al. | |
| 2005/0101757 | A1 * | 5/2005 | Glasgow et al. | 528/196 |
| 2005/0137359 | A1 | 6/2005 | Agarwal et al. | |
| 2005/0165207 | A1 * | 7/2005 | Agarwal et al. | 528/272 |
| 2007/0275242 | A1 | 11/2007 | Gopal et al. | |
| 2008/0125551 | A1 | 5/2008 | Vollenberg | |

FOREIGN PATENT DOCUMENTS

| | | | |
|---|---|---|---|
| JP | 03062848 | | 3/1991 |
| JP | 06240121 | | 8/1994 |
| JP | 080269311 | | 10/1996 |
| JP | 2000007902 | A | 1/2000 |
| JP | 2000256472 | | 9/2000 |
| JP | 20020179801 | | 6/2002 |
| JP | 2005089572 | | 4/2005 |
| KR | 20010083551 | | 9/2001 |
| WO | 8301253 | A1 | 4/1983 |
| WO | 9635216 | A1 | 11/1996 |
| WO | 9950332 | A1 | 10/1999 |
| WO | 03066704 | A1 | 8/2003 |
| WO | WO 2005066273 | A1 * | 7/2005 |
| WO | WO 2005075537 | A1 * | 8/2005 |
| WO | 2007089598 | A1 | 8/2007 |
| WO | 2007089747 | A1 | 8/2007 |
| WO | 2007111774 | A2 | 10/2007 |

OTHER PUBLICATIONS

International Search Report for International Application No. PCT/US2007/074242; Mailed Nov. 23, 2007; 6 pages.

Written Opinion for International Application No. PCT/US2007/074242; Mailed Nov. 23, 2007; 6 pages.

"GE Gives Plastic Bottle Recycling a New Spin"; ChemicalProcessing.com, Aug. 25, 2006 [online], accessed via the internet [retrieved on Oct. 16, 2009], URS: <http://www.chemicalprocessing.com/industrynews/2006/056.html>, 2 pages.

Pawlak,et al.; "Characterization of Scrap Poly(ethylene Terephthalate)"; European Polymer Journal, 36, p. 1875-1884; (2000).

ASTM D1003-00 "Standard Test Method for Haze and Luminous Transmittance of Transparent Plastics" Jul. 2000; West Conshohocken, PA (6 pages).

* cited by examiner

ELASTOMER BLENDS CONTAINING POLYCARBONATES AND COPOLYETHERESTERS DERIVED FROM POLYETHYLENE TEREPHTHALATE, METHOD OF MANUFACTURE, AND ARTICLES THEREFROM

CROSS REFERENCE TO RELATED APPLICATION

This application claims the benefits of U.S. Provisional Patent Application Ser. No. 60/820,468 filed Jul. 26, 2006, which is fully incorporated herein by reference.

BACKGROUND OF THE INVENTION

This disclosure relates to compositions and methods of preparation of blends containing polyesters and copolyetherester elastomers, methods for their manufacture, and articles thereof. The elastomer blends are derived from polyesters, in particular polyethylene terephthalate.

Polyethylene terephthalate (also referred to as "PET") is a polyester of terephthalic acid and ethylene glycol that can be obtained by the polycondensation of dimethyl terephthalate with ethylene glycol, and also terephthalic acid with ethylene glycol or ethylene oxide. PET exists both as an amorphous (transparent) and as a semi-crystalline (opaque and white) thermoplastic material. Generally, it has useful chemical resistance to mineral oils, solvents, and acids but not to bases. Semi-crystalline PET has good strength, ductility, stiffness, and hardness. Amorphous PET has better ductility but less stiffness and hardness. PET is used to make bottles for soft drinks and other household and consumer products. Generally, PET has many uses and several large markets. For this reason, the volume of PET manufactured is large and growing.

Unfortunately, despite recycling efforts, billions of pounds of PET are still dumped into landfills annually all over the world. Other PET that is not reused is incinerated. The PET that is disposed into landfills creates significant waste. The incineration of PET also wastes a significant resource that could be used more effectively.

Copolyetheresters, sometimes referred to as TPEE elastomers, are a special class of elastomeric materials. These materials exhibit thermoplastic processability on conventional molding equipment and exhibit the elasticity and resistance to impact and flex-fatigue of conventional cured rubbers. The combination of properties is obtained due to the result of the phase separation between the amorphous polyether segments (polyether blocks) and the crystalline polyester segments (polyester blocks) of the copolymer molecule. Because the immiscible segments are copolymerized into a single macromolecular backbone the necessary phase separation that occurs results in discrete domains with dimensions on the order of magnitude of the polymer chain. Thus, the polyether forms soft, amorphous domains that are physically crosslinked by the 'knots' of crystalline, polyester domains. That is, the amorphous soft blocks provide the elastomeric properties of flexibility and low temperature impact while the presence of the crystalline hard blocks result in discrete melting points, heat and chemical resistance, and mechanical strength. These materials are also commonly characterized by a lower temperature brittleness point than conventional rubbers, resilience, low creep, and very good resistance to oils, fuels, solvents, and chemicals.

Although molding compositions based on conventional copolyetheresters derived from PET are useful to many customers, these molding compositions can lack the ability to strike certain property balances, for example the combination of low temperature (−40° C.) ductility with a tensile modulus of about 1000 MPa, and/or the combination of optical transparency with good flexibility.

To that end, blends of polycarbonate or polycarbonate copolymers with copolyetheresters based on post-consumer PET, e.g., scrap PET create the ability and flexibility to create desired property balances for targeted applications.

Unfortunately, known solutions for making copolyetheresters do not offer effective ways of using PET scrap that meets today's customer needs. GB 1500577 discloses the treatment of scrap PET with an alkylene glycol in an amount equal to from 0.1 to 5 times the weight of the scrap PET. In a preferred embodiment, GB 1500577 discloses that these materials are heated at 200 to 250° C. to reflux the glycol for a period of about 8 hours or until the solution becomes clear. The first portion of the glycolization step is preferably carried out at atmospheric pressure and the final portion preferably is carried out at a pressure less than 0.5 mm Hg.

The examples of GB 1500577 disclose that "it will be observed that the modulus at various percents elongation for the product produced in accordance with the present invention is quite consistently about half of the modulus of the product produced in accordance with Example 4 of U.S. Pat. No. 3,701,755 when the ingredients are of closely comparable amounts." Example 4 of U.S. Pat. No. 3,701,755 discloses that "12.17 parts of bis(2-hydroxyethyl)terephthalate, 20.0 parts of poly(tetramethylene oxide)glycol (PTMG) with a molecular weight of 1800 and 0.014 part[s] of zinc[ ] acetate were charged into a reaction vessel at 200° C. The pressure was gradually reduced while heating, and the polycondensation was conducted under a high vacuum of less than 1 mm. Hg for 80 minutes. The obtained copolymer had a melting point of 208° C. and $\eta_{sp./c.}$=3.03." When treated and modified "in ways known for treating segmented copolyetherester elastomers," GB 1500577 discloses that its product is useful in the production of such items as garden hoses, industrial hose material, industrial tires, and tennis shoe soles.

Today's demanding customer needs often require elastomeric products having excellent performance properties. Although GB 1500577 demonstrates one way of using scrap PET, elastomeric polymers that exhibit about half of the modulus of monomer/bis(2-hydroxyethyl) terephthalate-based materials are not acceptable to many customers today. Solutions that require additional modification would not be practical or feasible for manufacturers.

Other attempts directed to using post-consumer polyesters such as PET have been directed to methods and devices designed to recover polymers or polymeric components obtained during the depolymerization of polymers. U.S. Pat. No. 6,162,837, for instance, discloses a method and device for recovering linear polyesters, such as PET and PBT, from polyester waste of the most varied form, in a continuous manner, in which undried or not dried-through waste is melted, the polymer chains being hydrolytically degraded by adhering moisture, and in which diol, corresponding to the basic constitutional unit of the polymer, is added to the melt resulting in glycolytic degradation, and the melt so treated is further condensed to the desired degree of polymerization. EP 1437377 discloses a process that involves a depolymerization reaction of used PET bottles with ethylene glycol, recovering dimethyl terephthalate (DMT) by ester interchange reaction with methanol, obtaining terephthalic acid by hydrolysis of the recovered DMT, and manufacturing a PET polymer that can be used for manufacturing PET bottles again by using the terephthalic acid. However, such solutions do not address the need to make copolyetheresters that have suitable commercial properties from scrap PET, e.g., copolyetheresters having properties comparable to PBT-based copolyetheresters.

For the foregoing reasons, there is an unmet need to develop improved elastomer blends of polycarbonates and copolyetheresters derived from post-consumer PET that exhibit excellent performance properties.

There is also an unmet need to develop improved blends of polycarbonates and copolyetheresters derived from scrap PET that retain a significant amount of the properties found in copolyetheresters that are not derived from post-consumer PET.

There further remains an unmet need to develop improved methods for making blends of polycarbonate and copolyetheresters derived from post-consumer PET.

BRIEF DESCRIPTION OF THE INVENTION

The above-described and other drawbacks are alleviated by a composition comprising: from 10 to 90 weight percent of a copolyetherester elastomer comprising: a modified, random polybutylene terephthalate copolymer block that is derived from a polyethylene terephthalate component selected from the group consisting of polyethylene terephthalate, polyethylene terephthalate copolymers, and combinations thereof; and that contains at least one residue derived from the polyethylene terephthalate component; and a polyalkylene oxide copolymer block that is derived from the polyethylene terephthalate component and a polyalkylene oxide glycol, and that contains polyalkylene oxide and at least one residue derived from the polyethylene terephthalate component; from 10 to 90 weight percent of a polycarbonate; and from 0 to 60 weight percent of a polyester.

Another embodiment is a composition comprising from 50 to 55 weight percent of a copolyetherester elastomer comprising: a modified, random polybutylene terephthalate copolymer block that is derived from a polyethylene terephthalate component selected from the group consisting of polyethylene terephthalate, polyethylene terephthalate copolymers, and combinations thereof; and that contains at least one residue derived from the polyethylene terephthalate component; and a polyalkylene oxide copolymer block that is derived from the polyethylene terephthalate component and a polyalkylene oxide glycol, and that contains polyalkylene oxide and at least one residue derived from the polyethylene terephthalate component; and from 45 to 50 weight percent of a polycarbonate copolymer comprising units derived from 1,1-bis(4-hydroxy-3-methylphenyl)cyclohexane; wherein an article molded from the composition having a thickness of 3.2 mm has a transmission of 35% or higher, measured in accordance with ASTM D1003-00.

Another embodiment is a composition comprising from 20 to 30 weight percent of a copolyetherester elastomer comprising: a modified, random polybutylene terephthalate copolymer block that is derived from a polyethylene terephthalate component selected from the group consisting of polyethylene terephthalate, polyethylene terephthalate copolymers, and combinations thereof, and that contains at least one residue derived from the polyethylene terephthalate component; and a polyalkylene oxide copolymer block that is derived from the polyethylene terephthalate component and a polyalkylene oxide glycol, and that contains polyalkylene oxide and at least one residue derived from the polyethylene terephthalate component; from 20 to 35 weight percent of a polycarbonate copolymer comprising units derived from 1,1-bis(4-hydroxy-3-methylphenyl)cyclohexane; and from 40 to 55 weight percent of poly(1,4-cyclohexylenedimethylene-1,4-cyclohexanedicarboxylate); wherein an article molded from the composition having a thickness of 3.2 mm has a transmission of 35% or higher, measured in accordance with ASTM D1003-00.

A method of manufacture of the above-described compositions comprises combining the components of the compositions; and extruding the blended compositions.

In still another embodiment, an article is provided comprising the above-described compositions.

A method of manufacture of an article comprises molding or extruding the above-described compositions.

Another embodiment is a method of preparing the copolyetherester elastomer, comprising combining a polyethylene terephthalate component, 1,4-butane diol, and a catalyst in a reactor in a liquid phase under agitation; depolymerizing the polyethylene terephthalate component by reacting the polyethylene terephthalate and the 1,4-butane diol under at least atmospheric pressure and an inert atmosphere, under conditions sufficient to depolymerize the polyethylene component into a molten mixture containing oligomers, 1,4-butane diol, ethylene glycol, and mixtures thereof, while refluxing the 1,4-butane diol back into the reactor; and agitating the molten mixture under subatmospheric pressure and removing excess diol, ethylene glycol, and tetrahydrofuran; and adding the polyalkylene oxide during the process in an amount and under conditions that are sufficient to form thermoplastic copolyetherester elastomer.

In yet another embodiment is a method of preparing the thermoplastic copolyetherester elastomer comprises depolymerizing a polyethylene terephthalate component by agitating the polyethylene terephthalate component with a member selected from the group consisting of ethylene glycol, 1,3-propane diol, and combinations thereof, in a reactor under at least atmospheric pressure in the presence if a catalyst component under conditions sufficient to depolymerize the polyethylene terephthalate component into a first molten mixture that comprises components selected from the group consisting of oligomers containing ethylene terephthalate moieties, oligomers containing trimethylene terephthalate moieties, ethylene glycol, propylene glycol, and combinations thereof; adding 1,4-butane diol to the first molten mixture in a reactor in the presence of a catalyst component, under conditions sufficient to form a second molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol, and combinations thereof, subjecting the second molten mixture to subatmospheric conditions and agitation sufficient to form the thermoplastic copolyetherester elastomer; and adding the polyalkylene oxide during the process in an amount and under conditions that are sufficient to form the copolyetherester and oligomers containing trimethylene terephthalate moieties, propylene glycol, and ethylene glycol are removed during formation of the thermoplastic copolyetherester elastomer.

These and other features, aspects, and advantages of the present invention will become better understood with reference to the following description and appended claims.

DETAILED DESCRIPTION OF THE INVENTION

The invention is based on the discovery that it is now possible to make blends of polycarbonates and copolyetheresters derived from scrap polyethylene terephthalate that exhibit outstanding performance properties. Advantageously, it has also been discovered that by using specific combination of materials, in varying amounts, it is possible to obtain compositions that are transparent, opaque or translucent, thereby providing a flexible solution to different customer's needs. Unlike conventional polycarbonate-copolyetherester blends containing copolyetheresters that are derived from monomers, the copolyetheresters of the invention contain residues derived from polyethylene terephthalate, e.g., ethylene glycol, isophthalic acid, and diethylene glycol groups. Despite this, the copolyetheresters impart excellent performance properties and can be used in many applications.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

All molecular weights in this application refer to weight average molecular weights. All such mentioned molecular weights are expressed in Daltons.

Compounds are described herein using standard nomenclature. The singular forms "a," "an," and "the" include plural referents unless the context clearly dictates otherwise. The endpoints of all ranges reciting the same characteristic or component are independently combinable and inclusive of the recited endpoint. All references are incorporated herein by reference. As used herein, "combinations thereof" is inclusive of one or more of the recited elements, optionally together with a like element not recited. Unless defined otherwise, technical and scientific terms used herein have the same meaning as is commonly understood by one of skill. Compounds are described using standard nomenclature.

All ASTM tests and data are from the 2003 edition of the Annual Book of ASTM Standards unless otherwise indicated.

The terms terephthalic acid group, isophthalic acid group, butane diol group, and ethylene glycol group in the formulas have the following meanings. The term "terephthalic acid group" (R') in a composition refers to a divalent 1,4-benzene radical (-1,4-$C_6H_4$—) remaining after removal of the carboxylic groups from terephthalic acid-. The term "isophthalic acid group" (R") refers to a divalent 1,3-benzene radical (-1,3-$C_6H_4$—) remaining after removal of the carboxylic groups from isophthalic acid. The term "butane diol group" (D) refers to a divalent butylene radical (—$C_4H_8$—) remaining after removal of hydroxyl groups from butane diol. The term "ethylene glycol group" (D') refers to a divalent ethylene radical (—$C_2H_4$—) remaining after removal of hydroxyl groups from ethylene glycol. With respect to the terms "isophthalic acid group," "ethylene glycol group," and "diethylene glycol group" being used in other contexts, e.g., to indicate the weight percent (wt %) of the group in a composition, the term "isophthalic acid group(s)" means the group having the formula —OC(O)$C_6H_4$C(O)—, the term "terephthalic acid group(s)" means the group having the formula —OC(O)$C_6H_4$C(O)— the term diethylene glycol group means the group having —O$C_2H_4$—O—$C_2H_4$—, the term "butane diol group(s)" means the group having the formula —O$C_4H_8$—, and the term "ethylene glycol groups(s)" means the group having formula —O$C_2H_4$—.

The terms "transparent," "translucent," and "opaque" have the following meanings. An article having a transmission of greater than or equal to 60% is classified as transparent, an article having a transmission of greater than or equal to 35% and less than 60% is classified as translucent, and an article having a transmission of less than 35% is classified as opaque. Haze and total luminous transmittance (%) are each measured in accordance with ASTM D1003-00. The foregoing classification is based on samples having a thickness of 3.2 mm.

In a specific embodiment, the invention relates to a composition comprising from 10 to 90 weight percent of a thermoplastic copolyetherester elastomer derived from, in particular, post-consumer polyethylene terephthalate. The random copolyetherester contains a modified, random polybutylene terephthalate copolymer block that is derived from a polyethylene terephthalate component selected from the group consisting of polyethylene terephthalate and polyethylene terephthalate copolymers, or a combination thereof; and contains at least one residue derived from the polyethylene terephthalate component; and a polyalkylene oxide copolymer block that is derived from a polyethylene terephthalate component and polyalkylene oxide glycol, and contains polyalkylene oxide and at least one residue derived from the polyethylene terephthalate component. The composition further comprises from 10 to 90 weight percent of a polycarbonate (which as used herein includes a polycarbonate copolymer), in particular polycarbonate copolymers comprising cyclohexyl groups and/or siloxane groups. The compositions further comprise from 0 to 60 weight percent of a polyester, in particular a poly(1,4-cyclohexylenedimethylene-1,4-cyclohexane dicarboxylate). Articles molded from the compositions having a thickness of 3.2 mm have good transparency, e.g., a transmission of 35% or higher.

In another embodiment, the invention relates to a composition comprising:

(1) from 10 to 90 wt % of a modified, random copolyetherester containing:

- (i) a modified, random polybutylene terephthalate copolymer block that is derived from a polyethylene terephthalate component selected from the group consisting of polyethylene terephthalate and polyethylene terephthalate copolymers and combinations thereof; and contains at least one residue derived from the polyethylene terephthalate component; and
- (ii) a polyalkylene oxide copolymer block that is derived from a polyethylene terephthalate component and polyalkylene oxide glycol, and that contains polyalkylene oxide and at least one residue derived from the polyethylene terephthalate component; and (2) from 10 to 90 wt % of a polycarbonate wherein the copolyetherester, the polycarbonate;

(3) from 0 to 60 wt % of a polyester, wherein copolyetherester, the polycarbonate, any polyester, and optionally any additives are present in a total amount of 100 wt %.

In the foregoing embodiments, the residue derived from the polyethylene terephthalate component can be selected from the group consisting of ethylene glycol groups, diethylene glycol groups, isophthalic acid groups, cobalt-containing compounds, antimony-containing compounds, germanium-containing compounds, tin containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the trans isomer of 1,3-cyclohexane dimethanol, the trans isomer of 1,4-cyclohexane dimethanol, alkali salts, alkaline salts, naphthalene dicarboxylic acids, 1,3-propane diol groups, and combinations thereof.

Depending on factors such as polyethylene terephthalate and polyethylene terephthalate copolymers, the residue can include various combinations. In one embodiment, for instance, the residue derived from the polyethylene terephthalate component comprises mixtures of ethylene glycol and diethylene glycol. Such mixtures can include additional materials, such as isophthalic acid. Such mixtures can also include the cis isomer of 1,3-cyclohexane dimethanol, cis isomer of 1,4-cyclohexane dimethanol, trans isomer of 1,3-cyclohexane dimethanol, trans isomer of 1,4-cyclohexane dimethanol and combinations thereof. In one embodiment, the residue derived from the polyethylene terephthalate component can selected from the group of cis isomer of 1,3-cyclohexane dimethanol, cis isomer of 1,4-cyclohexane dimethanol, the trans isomer of 1,3-cyclohexane dimethanol, trans isomer of 1,4-cyclohexane dimethanol and combinations thereof. In another embodiment, the residue derived from the polyethylene terephthalate component can be selected from the group consisting of ethylene glycol groups, diethylene glycol groups, isophthalic acid groups, cis isomer of 1,3-cyclohexane dimethanol, trans isomer of 1,3-cyclohexane dimethanol, cis isomer of 1,4-cyclohexane dimethanol, trans isomer of 1,4-cyclohexane dimethanol, and combinations thereof. In another embodiment, the residue derived from the polyethylene terephthalate component comprises mixtures of ethylene glycol, diethylene glycol, and cobalt-containing compounds. As above, in such mixtures, the at least one residue derived from the polyethylene terephthalate component further comprises isophthalic acid groups.

The molar amounts of the residue derived from the polyethylene terephthalate component can vary. In one embodiment, the residue derived from the polyethylene terephthalate component is selected from the group consisting of ethylene glycol groups, diethylene glycol groups, and cyclohexane dimethanol groups, and is in an amount ranging from 0.1 to 10 mole %, based on 100 mole % of glycol in the copolyetherester. In another embodiment, the residue derived from the polyethylene terephthalate component further comprises isophthalic acid groups in an amount ranging from 0 to 10 mole %, based on 100 mole % of acid functionality in the copolyetherester terephthalate copolymer. The total amount of materials of the polyethylene terephthalate residue can vary. For instance, sometimes, mixtures can be in an amount ranging from 1.8 to 2.5 wt %, or from 0.5 to 2 wt %, or from 1 to 4 wt %. The diethylene glycol group can be present in an amount ranging from 0.1 to 10 mole %, based on 100 mole % of glycol in the copolyetherester. The isophthalic acid group can be present in an amount ranging from 0.1 to 10 mole %, based on 100 mole % of acid in the copolyetherester.

The amount of the random polybutylene terephthalate copolymer block in the copolyetherester can vary. In one embodiment, the amount of the random polybutylene terephthalate copolymer ranges from 5 to 95, specifically from 20 to 80 wt %, based on 100 wt % of the total copolyetherester.

The recycle PET component from which the modified polybutylene terephthalate random copolymer is derived can be in any form that can be used according to the invention. Generally, the PET component includes recycle (scrap) PET from any source. For example, the PET can be post-consumer PET, and/or scrap PET from manufacturing processes of the PET itself or articles comprising the PET. In one embodiment, the PET component comprises post-consumer PET. The PET can be in flake, powder/chip, film, or pellet form. Before use, the PET is generally processed to remove impurities such as paper, adhesives, polypropylene polyvinyl chloride (PVC), nylon, polylactic acid, and other contaminants. Also, the PET component can include PET that is not waste in flake, chip, or pellet form. As such, PET that would ordinarily be deposited in landfills can now be used productively and effectively. In one embodiment, the PET component can also include other types of polyesters. The PET component can also include polyester copolymers. Examples of such materials include terephthalates such as virgin polyethylene terephthalate, polycyclohexane terephthalate, copolyesters of terephthalate esters with comonomers derived from cyclohexyl dimethanol and ethylene glycol, copolyesters of terephthalic acid with comonomers containing cyclohexyl dimethanol and ethylene glycol, polybutylene terephthalate, polyxylylene terephthalate, polydianol terephthalates, polybutylene terephthalate, polytrimethylene terephthalate, polyester naphthalates, and combinations thereof.

The polyalkylene oxide glycol can be selected from the group consisting of polyethylene oxide glycols, polypropylene oxide glycols, polybutylene oxide glycols, and combinations thereof. The polyalkylene oxide can be selected from the group consisting of polyethylene oxide, polypropylene oxide, polybutylene oxide, and combinations thereof. The amounts will vary, depending on the process conditions, customer needs, and the like.

The process for making the copolyetheresters in the blends can vary. In one embodiment, for instance, the process involves the steps of:

(a) depolymerizing a polyethylene terephthalate component selected from the group consisting of polyethylene terephthalate and polyethylene terephthalate copolymers by reacting the
   (i) polyethylene terephthalate component with
   (ii) 1,4-butane diol at a pressure that is at least atmospheric pressure in the presence of a catalyst component, under an inert atmosphere conditions sufficient to depolymerize the polyethylene terephthalate component into a molten mixture containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers butylene isophthalate moieties, covalently bonded oligomeric moieties containing at least two of the foregoing moieties, 1,4-butane diol, ethylene glycol, and combinations thereof; wherein the polyethylene terephthalate component and the diol are combined in the liquid phase under agitation and the diol is refluxed back into the reactor; and
(b) agitating the molten mixture under subatmospheric pressure and removing excess diol, ethylene glycol, and tetrahydrofuran; wherein the polyalkylene oxide glycol is added during the process in an amount and under conditions that are sufficient to form the copolyetherester.

The temperatures used in such a variation can vary. In this version, for instance, the polyethylene terephthalate can be depolymerized in various temperatures, e.g., a temperature ranging from 180 to 260° C. The temperature of the molten mixture is increased to a temperature ranging from 240 to 270° C.

The polyalkylene oxide glycol can be added at various stages of the process. In one embodiment, the polyallylene oxide glycol is added during the depolymerization of the polyethylene terephthalate component. In another embodiment, the polyallylene oxide glycol is added during the agitation of the molten mixture under subatmospheric pressure.

Also, the process contains an advantageous version in which one or more diols used in the process, for example, 1,4-butane diol, polyalkylene oxide glycol, 1,3-propane diol, and combinations thereof are derived from biomass, e.g., a grain such as corn or wheat, a cellulosic material, or a combination thereof.

The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols; diacids; monomers used to make diols or acids, (e.g., succinic acid), monomers used to make polymers; and the like. Biomass-based diols can be obtained from several sources. For instance, the following process can be used to obtain biomass-based 1,4-butane diol. Agriculture based biomass, such as corn, can be converted into succinic acid by a fermentation process that also consumes carbon dioxide. Such succinic acid is commercially available from several sources such as from Diversified Natural Products Inc. under the trade name "BioAmber™." This succinic acid can be easily converted into 1,4-butane diol by processes described in several prior art references, such as in U.S. Pat. No. 4,096,156. Biomass-derived 1,4-butane diol can also be converted to tetrahydrofuran, and further converted to polytetrahydrofuran, also known as polybutylene oxide glycol. Another process that describes converting succinic acid into 1,4-butane diol is sort forth in Life Cycles Engineering Guidelines, by Smith et al., as described in EPA publication EPA/600/R-1/101 (2001).

Thus, in a specific embodiment, the copolyetheresters can be made by:

(a) depolymerizing a polyethylene terephthalate component selected from the group consisting of polyethylene terephthalate, polyethylene terephthalate copolymers, and a combination thereof, by agitating the polyethylene terephthalate component with a member selected from the group consisting of ethylene glycol, 1,3 propane diol, and a combination thereof, in a reactor at a pressure that is at least atmospheric pressure in the presence of a catalyst component under conditions sufficient to depolymerize the polyethylene terephthalate component into a first molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol, and combinations thereof;

(b) adding 1,4-butane diol to the first molten mixture in a reactor in the presence of a catalyst component, under conditions that are sufficient to form a second molten mixture containing a component selected from the group consisting of oligomers containing ethylene terephthalate moieties, oligomers containing trimethylene terephthalate moieties, propylene glycol, ethylene glycol, and combinations thereof; and (c) subjecting the second molten mixture to subatmospheric conditions and agitation sufficient to form the copolyetherester; and (d) adding the polyalkylene oxide glycol during the process in an amount and under conditions that are sufficient to form the copolyetherester, and oligomers containing trimethylene terephthalate moieties, propylene glycol, and ethylene glycol are removed during formation of the copolyetherester. The embodiment can also include variations. For instance, temperatures used during the process can vary. The polyethylene terephthalate component, for instance, can be depolymerized at a temperature ranging from 190 to 250° C., under an inert atmosphere. Step (b) of this embodiment (where 1,4-butane diol is added to the first molten mixture) can be conducted at a temperature ranging from 190 to 240° C. During step (c) (where the second molten mixture is subjected to subatmospheric conditions and agitation sufficient to form the copolyetherester), the temperature can be increased to a temperature ranging from 240 to 260° C.

The polyalkylene oxide glycol can be added at different stages of the process. In one embodiment, the polyalkylene oxide glycol is added during the depolymerization of the polyethylene terephthalate component. In another embodiment, the polyalkylene oxide glycol is added during the agitation of the first molten mixture. In another embodiment, the polyalkylene oxide glycol is added during the agitation of the second molten mixture. The mounts of the polyalkylene oxide can vary. In one embodiment, the polyalkylene oxide is present in an amount ranging from 5 to 95 wt %, specifically 20 to 80 wt % polyalkylene oxide, based on the total weight of the copolyetherester.

The 1,4-butane diol, polyalkylene oxide, or a combination thereof in the foregoing embodiments can be derived from biomass. In one embodiment, the biomass is a grain selected from the group consisting of a grain such as corn or wheat, cellulosic material, and a combination thereof.

The polyalkylene oxide can be selected from the group consisting of polyethylene oxide, polypropylene oxide, polybutylene oxide, and combinations thereof. The amounts will vary, depending on the process conditions, customer needs, and the like. In one embodiment, a polybutylene oxide glycol is used to provide the polyoxyalkylene groups, i.e., the polyalkylene oxide copolymer block comprises poly(1,4-butylene oxide). The polybutylene oxide glycol can have a number-average molecular weight of 100 to 5000 Daltons, or more specifically, 150 to 4,000, or even more specifically, 200 to 3,000 Daltons. In a specific embodiment, a combination of long and short chain polybutylene oxide glycols is used, for example a polybutylene oxide glycol component having a number average molecular weight of 100 to 5000 Daltons, and another polybutylene oxide glycol component having a molecular weight of less than 2500 Daltons. A specific polybutylene oxide glycol for use in the foregoing embodiments is poly(1,4-butylene oxide) glycol. Thus, in a specific embodiment, copolyetheresters used in the blends can comprise the following:

(1) a long chain ester having the formula:

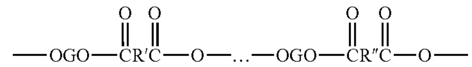

wherein G is the divalent polyalkylene oxide radical remaining after removal of the terminal hydroxyl groups from a poly(butylene oxide) glycol having a number-average molecular weight of 100 to 5000 Daltons; and R' is the divalent terephthalic radical remaining after removal of the carboxyl groups from a terephthalic dicarboxylic acid; and R" is a divalent isophthalic radical remaining after removal of the carboxyl groups from an isophthalic dicarboxylic acid; and (2) short-chain ester units having the formula:

$$-ODO-\overset{O}{\overset{\|}{C}}R'\overset{O}{\overset{\|}{C}}-O-\ldots-ODO-\overset{O}{\overset{\|}{C}}R''\overset{O}{\overset{\|}{C}}-O-\ldots-OD'O-\overset{O}{\overset{\|}{C}}R'\overset{O}{\overset{\|}{C}}-O-\ldots-OD'O-\overset{O}{\overset{\|}{C}}R''\overset{O}{\overset{\|}{C}}-O-$$

wherein D is the divalent butylene radical remaining after removal of the hydroxyl groups from butanediol having a molecular weight of less than 250; and R' and R" are as defined above; and wherein D' is a divalent ethylene radical after removal of hydroxyl groups of ethylene glycol or diethylene glycol.

In a specific embodiment, the copolyetherester comprising polybutylene oxide groups further comprises terephthalic acid groups. Such copolymers can have 25 to 65 wt %, more specifically 30 to 60 wt %, even more specifically 25 to 55 wt % of units derived from polybutylene oxide glycol or a chemical equivalent thereof, based on the weight of the copolymer. A poly(butylene terephthalate-butylene oxide) copolymer can further comprise isophthalic acid in addition to terephthalic acid. In one embodiment, the poly(butylene terephthalate/isophthalate-o butylene oxide) copolymer comprises 0 to 40 mole % of units derived from isophthalic acid or a chemical equivalent thereof, based on the total number of isophthalate and terephthalate units. For example, the poly(butylene terephthalate/isophthalate-oxytetramethylene) copolymer can comprise less than 5 mole % of isophthalate units, specifically 0 to 5 mole % of isophthalate units, based on the total number of isophthalate and terephthalate units in the copolymer. In another embodiment, the poly(butylene terephthalate/isophthalate-oxytetramethylene) copolymer comprises greater than 5 mole % of isophthalate units, specifically 5 to 40 mole %, based on the total number of isophthalate and terephthalate units in the copolymer.

The copolyetheresters made from the recycle PET can be characterized by the glass transition temperature (Tg) of the soft block and the melting temperature (Tm) of the hard block. In general, the Tg of the soft block can be 25 to −85° C., specifically −45 to −65° C., and the Tm of the hard block can be 120 to 200° C., specifically 150 to 195° C.

The polycarbonate component can be any polycarbonate, which when combined with the copolyetheresters, forms a blend. As used herein, the terms "polycarbonate" and "polycarbonate resin" mean compositions having repeating structural carbonate units of the formula (1):

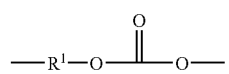

(1)

in which at least 60 percent of the total number of $R^1$ groups are a aromatic organic radical and the balance thereof are aliphatic, alicyclic, or aromatic radicals. The term "polycarbonate" as used herein includes copolycarbonates, that is, copolymers comprising two or more different $R^1$ groups. In one embodiment, each $R^1$ is an aromatic organic radical, for example a radical of the formula (2):

$$-A^1-Y^1-A^2- \quad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S($O_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene, or isopropylidene.

As used herein, the term "aliphatic" refers to a hydrocarbon radical having a valence of at least one comprising a linear or branched array of carbon atoms which is not cyclic; "aromatic" refers to a radical having a valence of at least one comprising at least one aromatic group; "cycloaliphatic" refers to a radical having a valence of at least one comprising an array of carbon atoms which is cyclic but not aromatic; "alkyl" refers to a straight or branched chain monovalent hydrocarbon radical; "allylene" refers to a straight or branched chain divalent hydrocarbon radical; "alkylidene" refers to a straight or branched chain divalent hydrocarbon radical, with both valences on a single common carbon atom; "alkenyl" refers to a straight or branched chain monovalent hydrocarbon radical having at least two carbons joined by a carbon-carbon double bond; "cycloalkyl" refers to a non-aromatic alicyclic monovalent hydrocarbon radical having at least three carbon atoms, with at least one degree of unsaturation; "cycloallylene" refers to a non-aromatic alicyclic divalent hydrocarbon radical having at least three carbon atoms, with at least one degree of unsaturation; "aryl" refers to a monovalent aromatic benzene ring radical, or to an optionally substituted benzene ring system radical system fused to at least one optionally substituted benzene rings; "arylene" refers to a benzene ring diradical or to a benzene ring system diradical fused to at least one optionally substituted benzene rings; "acyl" refers to a monovalent hydrocarbon radical joined to a carbonyl carbon atom, wherein the carbonyl carbon further connects to an adjoining group; "allylaryl" refers to an allyl group as defined above substituted onto an aryl as defined above; "arylalkyl" refers to an aryl group as defined above substituted onto an alkyl as defined above; "alkoxy" refers to an alkyl group as defined above connected through an oxygen radical to an adjoining group; "aryloxy" refers to an aryl group as defined above connected through an oxygen radical to an adjoining group; and "direct bond", where part of a structural variable specification, refers to the direct joining of the substituents preceding and succeeding the variable taken as a "direct bond."

Polycarbonates can be produced by the interfacial reaction of dihydroxy compounds having the formula HO—$R^1$—OH, which includes dihydroxy compounds of formula (3)

$$HO-A^1-Y^1-A^2-OH \quad (3)$$

wherein $Y^1$, $A^1$ and $A^2$ are as described above. Also included are bisphenol compounds of general formula (4):

(4)

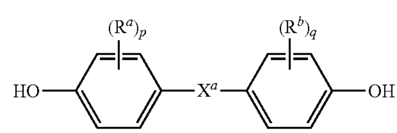

wherein $R^a$ and $R^b$ each represent a halogen atom or a monovalent hydrocarbon group and can be the same or different; p and q are each independently integers of 0 to 4; and $X^a$ represents one of the groups of formula (5):

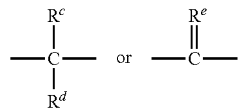

wherein $R^c$ and $R^d$ each independently represent a hydrogen atom or a monovalent linear or cyclic hydrocarbon group and $R^e$ is a divalent hydrocarbon group.

In an embodiment, $X^a$ is cyclohexylidene. A specific example wherein $X^a$ is a substituted cycloalkylidene is the cyclohexylidene-bridged, alkyl-substituted bisphenol of formula (6)

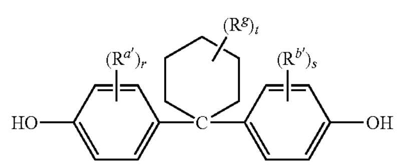

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. In a specific embodiment, at least one of each of $R^{a'}$ and $R^{b'}$ are disposed Meta to the cyclohexylidene bridging group. The substituents $R^{a'}$, $R^{b'}$, and $R^g$ may, when comprising an appropriate number of carbon atoms, be straight chain, cyclic, bicyclic, branched, saturated, or unsaturated. In an embodiment, $R^{a'}$ and $R^{b'}$ are each independently $C_{1-4}$ allyl, $R^g$ is $C_{1-3}$ alkyl, r and s are each 1 to 2, and t is 0 to 5, specifically 0. In another specific embodiment, $R^{a'}$, $R^{b'}$ and $R^g$ are each methyl, r and s are each 1, and t is 0 or 3. The cyclohexylidene-bridged bisphenol can be the reaction product of two moles of o-cresol with one mole of cyclohexanone. In another exemplary embodiment, the cyclohexylidene-bridged bisphenol is the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromo-phenyl) propane, 1,1-bis(hydroxyphenyl)cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl)cyclododecane, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds represented by formula (3) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl) n-butane, 2,2-bis(4-hydroxy-1-methylphenyl) propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds can also be used. For example, copolymer can be used, comprising a mixture of units derived from bisphenol A and 1,1-bis(4-hydroxy-3-methylphenyl)cyclohexane.

Branched polycarbonates are also useful, as well as blends of a linear polycarbonate and a branched polycarbonate. The branched polycarbonates can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents can be added at a level of 0.05 to 2.0 wt % of the polycarbonate. All types of polycarbonate end groups are contemplated as being useful in the polycarbonate, provided that such end groups do not significantly affect desired properties of the thermoplastic compositions.

In a specific embodiment, the polycarbonate is a linear homopolymer derived from bisphenol A, in which each of $A^1$ and $A^2$ is p-phenylene and $Y^1$ is isopropylidene. The polycarbonates can have an intrinsic viscosity, as determined in chloroform at 25° C., of 0.3 to 1.5 deciliters per gram (dl/g), specifically 0.45 to 1.0 dl/g. The polycarbonates can have a weight average molecular weight (Mw) of 10,000 to 100,000, as measured by gel permeation chromatography (GPC) using a crosslinked styrene-divinyl benzene column, at a sample concentration of 1 milligram per milliliter, and as calibrated with polycarbonate standards.

"Polycarbonates" and "polycarbonate resin" as used herein can include copolymers comprising carbonate chain units. A specific suitable copolymer is a polyester-polycarbonate, also known as a copolyester-polycarbonate and polyester-carbonate. Combinations of polycarbonates and polyester-polycarbonates can also be used. As used herein, a "combination" is inclusive of all mixtures, blends, alloys, reaction products, and the like. Polyester-polycarbonates contain, in addition to recurring carbonate chain units of the formula (1), repeating units of formula (7):

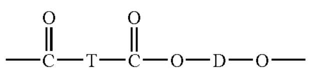

wherein D is a divalent radical derived from a dihydroxy compound, and can be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T divalent radical derived from a dicarboxylic acid, and can be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (8):

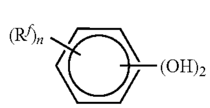

(8)

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that can be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that can be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 91:1 to 2:98. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In addition to the ester units, the polyester-polycarbonates comprise carbonate units as described hereinabove. Carbonate units of formula (1) can also be derived from aromatic dihydroxy compounds of formula (8), wherein specific carbonate units are resorcinol carbonate units.

Specifically, the polyester unit of a polyester-polycarbonate can be derived from the reaction of a combination of isophthalic and terephthalic diacids (or derivatives thereof) with resorcinol, bisphenol A, or a combination comprising one or more of these, wherein the molar ratio of isophthalate units to terephthalate units is 91:9 to 2:98, specifically 85:15 to 3:97, more specifically 80:20 to 5:95, and still more specifically 70:30 to 10:90. The polycarbonate units can be derived from resorcinol and/or bisphenol A, in a molar ratio of resorcinol carbonate units to bisphenol A carbonate units of 0:100 to 99:1, and the molar ratio of the mixed isophthalate-terephthalate polyester units to the polycarbonate units in the polyester-polycarbonate can be 1:99 to 99:1, specifically 5:95 to 90:10, more specifically 10:90 to 80:20. Where a blend of polyester-polycarbonate with polycarbonate is used, the weight ratio of polycarbonate to polyester-polycarbonate in the blend can be, respectively, 1:99 to 99:1, specifically 10:90 to 90:10.

The polyester-polycarbonates can have a weight-averaged molecular weight (Mw) of 1,500 to 100,000, specifically 1,700 to 50,000, and more specifically 2,000 to 40,000. Molecular weight determinations are performed using gel permeation chromatography (GPC), using a crosslinked styrene-divinylbenzene column, and calibrated to polycarbonate references. Samples are prepared at a concentration of about 1 mg/ml, and are eluted at a flow rate of about 1.0 ml/min.

Processes such as interfacial polymerization and melt polymerization can manufacture suitable polycarbonates. Although the reaction conditions for interfacial polymerization can vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., 8 to 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. A chain stopper (also referred to as a capping agent) can be included during polymerization. The chain-stopper limits molecular weight growth rate, and so controls molecular weight in the polycarbonate. A chain-stopper can be at least one of mono-phenolic compounds, mono-carboxylic acid chlorides, and/or mono-chloroformates.

For example, mono-phenolic compounds suitable as chain stoppers include monocyclic phenols, such as phenol, $C_{1-22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms. A mono-phenolic UV absorber can be used as capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Specifically, mono-phenolic chain-stoppers include phenol, p-cumylphenol, and/or resorcinol monobenzoate.

Mono-carboxylic acid chlorides can also be suitable as chain stoppers. These include monocyclic, mono-carboxylic acid chlorides such as benzoyl chloride, $C_{1-22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides such as trimellitic anhydride chloride, and naphthoyl chloride; and mixtures of monocyclic and polycyclic mono-carboxylic acid chlorides. Chlorides of aliphatic monocarboxylic acids with up to 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and mixtures thereof.

The polyester-polycarbonates can be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

Among the phase transfer catalysts that can be used are catalysts of the formula $(R^{15})_4Q^+X$, wherein each $R^{15}$ is the same or different, and is a $C_{1-10}$ alkyl group; Q is a nitrogen or phosphorus atom; and X is a halogen atom or a $C_{1-8}$ alkoxy group or $C_{6-8}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst can be 0.1 to 10 wt % based on the weight of bisphenol in the phosgenation mixture. In another embodiment an effective amount of phase transfer catalyst can be 0.5 to 2 wt % based on the weight of bisphenol in the phosgenation mixture.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury mixer, twin screw extruder, or the like to form a uniform dispersion. Volatile monohydric phenol is removed from the molten reactants by distillation and the polymer is isolated as a molten residue.

In addition to the polycarbonates, polyester-polycarbonates, polysiloxane-polycarbonates, and combinations of these as described above, it is also possible to use combinations of the polycarbonates and polyester-polycarbonates with other thermoplastic polymers, for example combinations of polycarbonates and/or polycarbonate copolymers with polyesters.

The polycarbonate can also be a polysiloxane-polycarbonate copolymer, also referred to as a polysiloxane-polycarbonate. The polysiloxane (also referred to herein as "polydiorganosiloxane") blocks of the copolymer comprise repeating siloxane units (also referred to herein as "diorganosiloxane units") of formula (9):

(9)

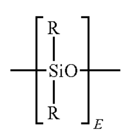

wherein each occurrence of R is same or different, and is a $C_{1-13}$ monovalent organic radical. For example, R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination thereof. Combinations of the foregoing R groups can be used in the same copolymer.

The value of E in formula (9) can vary widely depending on the type and relative amount of each component in the thermoplastic composition, the desired properties of the composition, and like considerations. Generally, E can have an average value of 2 to 1,000, specifically 2 to 500, and more specifically 5 to 100. In one embodiment, E has an average value of 10 to 75, and in still another embodiment, E has an average value of 40 to 60. Where E is of a lower value, e.g., less than 40, it can be desirable to use a relatively larger amount of the polycarbonate-polysiloxane copolymer. Conversely, where E is of a higher value, e.g., greater than 40, it can be necessary to use a relatively lower amount of the polycarbonate-polysiloxane copolymer.

A combination of a first and a second (or more) polysiloxane-polycarbonate copolymer can be used, wherein the average value of E of the first copolymer is less than the average value of E of the second copolymer.

In one embodiment, the polydiorganosiloxane blocks are provided by repeating structural units of formula (10):

(10)

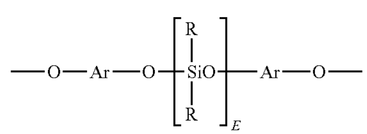

wherein E is as defined above; each R can independently be the same or different, and is as defined above; and each Ar can independently be the same or different, and is a substituted or unsubstituted $C_{6-30}$ arylene radical, wherein the bonds are directly connected to an aromatic moiety. Suitable Ar groups in formula (10) can be derived from a $C_{6-30}$ dihydroxyarylene compound, for example a dihydroxyarylene compound of formula (3), (4), or (8) above. Combinations comprising at least one of the foregoing dihydroxyarylene compounds can also be used. Specific examples of suitable dihydroxyarylene compounds are 1,1-bis(4-hydroxyphenyl)methane, 1,1-bis (4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis (4-hydroxyphenyl) n-butane, 2,2-bis(4-hydroxy-1-methylphenyl) propane, 1,1-bis(4-hydroxyphenyl) cyclohexane, bis(4-hydroxyphenyl sulphide), and 1,1-bis(4-hydroxy-t-butylphenyl) propane. Combinations comprising at least one of the foregoing dihydroxy compounds can also be used.

Units of formula (10) can be derived from the corresponding dihydroxy compound of formula (11):

(11)

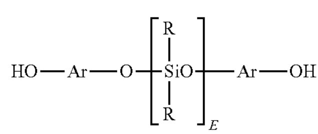

wherein R, Ar, and E are as described above. Compounds of formula (11) can be obtained by the reaction of a dihydroxyarylene compound with, for example, an alpha, omega-bisacetoxypolydiorangonosiloxane under phase transfer conditions.

In another embodiment, polydiorganosiloxane blocks comprise units of formula (12):

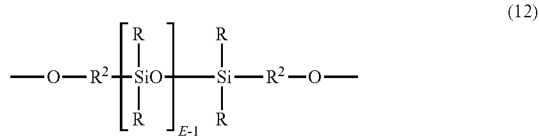

(12)

wherein R and E are as described above, and each occurrence of $R^2$ is independently a divalent $C_{1-30}$ allylene, and wherein the polymerized polysiloxane unit is the reaction residue of its corresponding dihydroxy compound. In a specific embodiment, the polydiorganosiloxane blocks are provided by repeating structural units of formula (13):

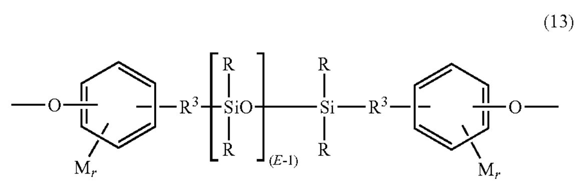

(13)

wherein R and E are as defined above. Each $R^3$ in formula (13) is independently a divalent $C_{2-8}$ aliphatic group. Each M in formula (13) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each r is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, r is one, $R^3$ is a divalent $C_{1-3}$ aliphatic group, and R is methyl.

Units of formula (13) can be derived from the corresponding dihydroxy polydiorganosiloxane (14):

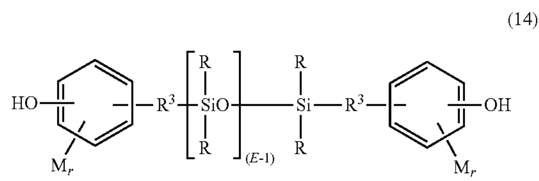

(14)

wherein R, E, M, $R^3$, and r are as described above. Such dihydroxy polysiloxanes can be made by effecting a platinum catalyzed addition between a siloxane hydride of formula (15):

$$H\left[\begin{matrix}R\\ |\\ SiO\\ |\\ R\end{matrix}\right]_{(E-1)}\begin{matrix}R\\ |\\ SiH\\ |\\ R\end{matrix} \quad (15)$$

wherein R and E are as previously defined, and an aliphatically unsaturated monohydric phenol. Suitable aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing can also be used.

The polysiloxane-polycarbonate can comprise 50 to 99 wt % of carbonate units and 1 to 50 wt % siloxane units. Within this range, the polysiloxane-polycarbonate copolymer can comprise 70 to 98 wt %, specifically 75 to 97 wt % of carbonate units and 2 to 30 wt %, specifically 3 to 25 wt % siloxane units.

In an embodiment, the polysiloxane-polycarbonate can comprise polysiloxane units, and carbonate units derived from bisphenol A, e.g., the dihydroxy compound of formula (3) in which each of $A^1$ and $A^2$ is p-phenylene and $Y^1$ is isopropylidene. In another embodiment, $Y^1$ is cyclohexylidene. In another embodiment, the polysiloxane-polycarbonate comprises polysiloxane units and a carbonate unit derived from 1,1-bis(4-hydroxy-3-methylphenyl)cyclohexane, or a mixture of unites derived from bisphenol A and 1,1-bis(4-hydroxy-3-methylphenyl)cyclohexane.

Polysiloxane-polycarbonates can have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C./1.2 kg, of 1 to 50 cubic centimeters per 10 minutes (cc/10 min), specifically 2 to 30 cc/10 min. Mixtures of polysiloxane-polycarbonates of different flow properties can be used to achieve the overall desired flow property.

The amount of the polycarbonate component varies with the specific application. In one embodiment, the amount of the polycarbonate component is from 1 to 50 wt %. In another embodiment, the amount of polycarbonate present in the composition ranges from to 5 to 45 wt %. In still another embodiment, the composition comprises 10 to 90 wt % of the polycarbonate component, specifically 20 to 60 wt %, more specifically 20 to 35 wt %, or alternatively 45 to 50 wt %.

From 0 to 60 wt % of a polyester can be present in the composition. The polyester component can be any polyester, which when combined with the copolyetheresters and polycarbonate, forms a blend. The polyester component comprises repeating units of the formula (6) as described above. Copolyesters containing a combination of different T and/or D groups can be used. Chemical equivalents of diacids include the corresponding esters, alkyl esters, e.g., $C_{1-3}$ dialkyl esters, diaryl esters, anhydrides, salts, acid chlorides, acid bromides, and the like. Chemical equivalents of dihydroxy compounds include the corresponding esters, such as $C_{1-3}$ dialkyl esters, diaryl esters, and the like. The polyesters can be branched or linear.

Examples of $C_{6-20}$ aromatic dicarboxylic acids that can be used to prepare the polyesters include isophthalic acid, terephthalic acid, 1,2-di(p-carboxyphenyl)ethane, 4,4'-dicarboxydiphenyl ether, 4,4'-bisbenzoic acid, and the like, and 1,4- or 1,5-naphthalene dicarboxylic acids and the like. A combination of isophthalic acid and terephthalic acid can be used, wherein the weight ratio of isophthalic acid to terephthalic acid is 91:9 to 2:98, specifically 25:75 to 2:98. Exemplary $C_{5-20}$ cycloaliphatic dicarboxylic acids contain at least one cycloaliphatic moiety and include monocyclo- and bicyclo-aliphatic acids such as decahydronaphthalene dicarboxylic acids, norbornene dicarboxylic acids, bicyclooctane dicarboxylic acids, 1,4-cyclohexanedicarboxylic acid (both cis and trans), specifically trans-1,4-cyclohexanedicarboxylic acid, 1,4-hexylenedicarboxylic acid, and the like. Aliphatic $C_{2-20}$ dicarboxylic acids such as adipic acid, azelaic acid, dicarboxyl dodecanoic acid, and succinic acid can also be useful.

Exemplary diols useful in the preparation of the polyesters include aliphatic diols such as ethylene glycol, 1,2-propylene glycol, 1,3-propylene glycol, 2,2-dimethyl-1,3-propane diol, 2-ethyl-2-methyl-1,3-propane diol, 1,4-butane diol, 1,4-but-2-ene diol, 1,5-pentane diol, 1,5-pentane diol, dipropylene glycol, 2-methyl-1,5-pentane diol, and the like. Exemplary cycloaliphatic diols include a cycloaliphatic moiety, for example 1,6-hexane diol, dimethanol decalin, dimethanol bicyclooctane, 1,4-cyclohexane dimethanol (including its cis- and trans-isomers), triethylene glycol, 1,10-decanediol, and the like. Chemical equivalents of the diols include esters, such as $C_{1-3}$ dialkyl esters, diaryl esters, and the like.

Specific exemplary poly(alkylene terephthalate) polyesters include poly(ethylene terephthalate) (PET), poly(butylene terephthalate) (PBT), poly(ethylene naphthalate) (PEN), poly(butylene naphthalate) (PBN), and poly(1,3-propylene terephthalate) (PPT).

In another embodiment, the polyester can also include polyesters that contain at least one residue derived from the polyethylene terephthalate component and are selected from (1) modified polybutylene terephthalate random copolymers derived from a polyethylene terephthalate component selected from the group of polyethylene terephthalate and polyethylene terephthalate copolymers and containing at least one residue derived from the polyethylene terephthalate component and (2) polytrimethylene terephthalate random copolymers that are derived from polyethylene terephthalate component selected from the group consisting of polyethylene terephthalate and polyethylene terephthalate copolymers. The modified polybutylene terephthalate random copolymers can be made by any suitable method in which a polyethylene terephthalate component is depolymerized with a diol and the resulting mixture is polymerized with 1,4-butane diol into the modified polybutylene terephthalate random copolymer. Similarly, the modified polytrimethylene terephthalate random copolymer can be made by any suitable method in which a polyethylene terephthalate component is depolymerized with a diol and the resulting mixture is polymerized with 1,3 propane diol into the modified polytrimethylene terephthalate random copolymer.

Another class of polyesters includes at least one cycloaliphatic moiety. Such polyesters have the formula (16)

(16)

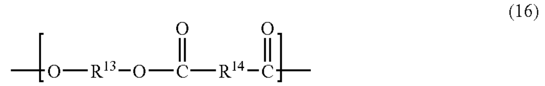

wherein $R^{13}$ and $R^{14}$ are independently at each occurrence an aryl, aliphatic or cycloalkane having 2 to 20 carbon atoms and chemical equivalents thereof, with the proviso that at least one of $R^{13}$ and $R^{14}$ is a cycloaliphatic group. The cycloaliphatic polyester is a condensation product where $R^{13}$ is the residue of a diol or a chemical equivalent thereof and $R^{14}$ is decarboxylated residue of a diacid or a chemical equivalent thereof. In one embodiment cycloaliphatic polyesters are those having both $R^{13}$ and $R^{14}$ as cycloalkyl containing radicals. Such polyesters generally contain at least 50 mole % of cycloaliphatic diacid and/or cycloaliphatic diol components, the remainder, if any, being linear aliphatic diacids and/or diols.

In one embodiment $R^{13}$ and $R^{14}$ are cycloalkyl radicals independently selected from the following structural units of (17).

(17)

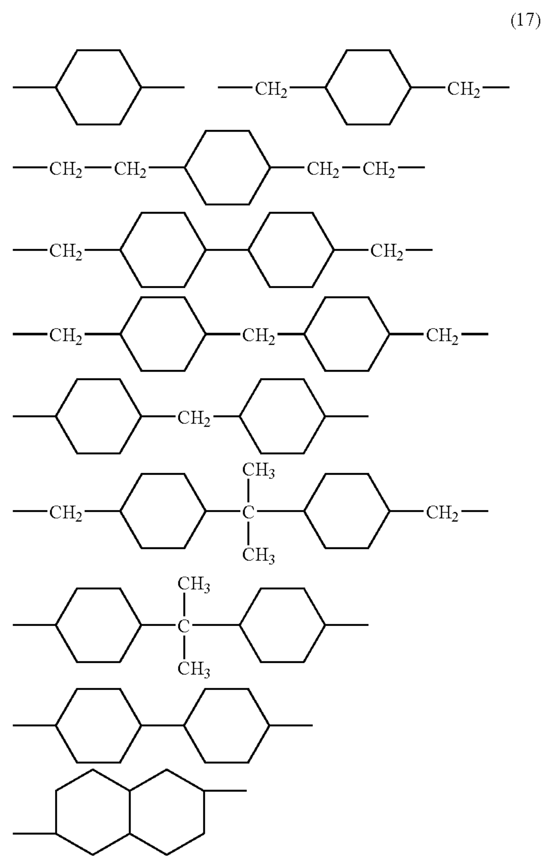

In one embodiment the diol or chemical equivalent thereof used is 1,4-cyclohexane dimethanol or a chemical equivalent thereof. Either or both of the cis or trans isomers of the 1,4-cyclohexane dimethanol can be used. Chemical equivalents to the diols include esters, such as dialkylesters, diaryl esters, and the like. Specific non-limiting examples of diacids include decahydro naphthalene dicarboxylic acids, norbornene dicarboxylic acids, bicyclo octane dicarboxylic acids, 1,4-cyclohexanedicarboxylic acid or the chemical equivalents thereof. Most specifically the diacids include trans-1,4-cyclohexanedicarboxylic acid or a chemical equivalent thereof. Chemical equivalents of these diacids include esters, alkyl esters, e.g., dialkyl esters, diaryl esters, anhydrides, salts, acid chlorides, acid bromides, and the like. In one embodiment the chemical equivalent comprises the dialkyl esters of the cycloaliphatic diacids, and most specifically the chemical equivalent comprises the dimethyl ester of the acid, such as dimethyl-1,4-cyclohexane-dicarboxylate.

Cyclohexane dicarboxylic acids and their chemical equivalents can be prepared, for example, by the hydrogenation of cycloaromatic diacids and corresponding derivatives such as isophthalic acid, terephthalic acid or naphthalenic acid in a suitable solvent such as water or acetic acid using a suitable catalysts such as rhodium supported on a carrier such as carbon or alumina. They can also be prepared by the use of an inert liquid medium in which a phthalic acid is at least partially soluble under reaction conditions and with a catalyst of palladium or ruthenium on carbon or silica.

Typically, in the hydrogenation, two isomers are obtained in which the carboxylic acid groups are in cis- or trans-positions. The cis- and trans-isomers can be separated by crystallization with or without a solvent, for example, using n-heptane, or by distillation. The cis- and trans-isomers have different physical properties and can be used independently or as a mixture. Mixtures of the cis- and trans-isomers are useful herein as well.

When the mixture of isomers or more than one diacid or diol is used, a copolyester or a mixture of two polyesters can be used as the cycloaliphatic polyester.

In one embodiment the cycloaliphatic radical $R^{14}$ is derived from the 1,4-cyclohexyl diacids with generally greater than 70 mole % thereof in the form of the trans isomer, and the cycloaliphatic radical $R^{13}$ is derived from a 1,4-cyclohexyl diols such as 1,4-cyclohexyl dimethanol, with greater than 70 mole % thereof in the form of the trans isomer.

A specific cycloaliphatic polyester is poly(cyclohexane-1,4-dimethylene cyclohexane-1,4-dicarboxylate) also referred to as poly(1,4-cyclohexane-dimethanol-1,4-dicarboxylate) (PCCD). Another specific ester is poly(1,4-cyclohexylene dimethylene co-ethylene terephthalate) (PCTG) wherein greater than 50 mol % of the ester groups are derived from 1,4-cyclohexanedimethanol; and poly(ethylene-co-1,4-cyclohexylenedimethylene terephthalate) wherein greater than 50 mol % of the ester groups are derived from ethylene (PTCG). Also contemplated for use herein are any of the above polyesters with minor amounts, e.g., from 0.5 to 5 percent by weight, of units derived from aliphatic acid and/or aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

The cycloaliphatic polyesters have a weight-average molecular weight (Mw), measured, for example, by ultra-centrifugation or light scattering of 25,000 Daltons to 85,000 Daltons. The weight average molecular weight is more specifically 30,000 Daltons to 80,000 Daltons and most specifically 60,000 to 80,000 Daltons.

The amount of the polyester component varies with the specific application. In one embodiment, the amount of the polyester component is from more than 0 to 60 wt %. In another embodiment, the amount of polyester present in the composition ranges from to 1 to 50 wt %. In still another embodiment, the composition comprises 10 to 80 wt % of the polyester component, specifically 20 to 60 wt %, more specifically 40 to 55 wt %.

The blends can contain additives, e.g., carboxy reactive components and flame retardants.

The flame-retarding component can be added the composition to suppress, reduce, delay, or modify the propagation of a flame through a composition or an article based on the composition. The flame-retarding component can be halogenated hydrocarbons (chlorine and bromine containing compounds and reactive flame retardants), inorganic flame retardants (boron compounds, antimony oxides, aluminum hydroxide, molybdenum compounds, zinc and magnesium oxides), phosphorous containing compounds (organic phosphate esters, phosphates, halogenated phosphorus compounds and inorganic phosphorus containing salts) and nitrogen containing compounds like melamine cyanurate.

Inorganic flame retardants can include metal hydroxides, antimony compounds, boron compounds, other metal compounds, phosphorous compounds, and other inorganic flame retardant compounds. Examples of suitable metal hydroxides include magnesium hydroxide, aluminum hydroxide, and other metal hydroxides. Examples of suitable antimony-based flame retardants include antimony trioxide, sodium antimonate, antimony pentoxide, and other antimony-based inorganic compounds. Examples of suitable boron compounds include zinc borate, boric acid, borax, as well as other boron-based inorganic compounds. Examples of other metal compounds include molybdenum compounds, molybdenum trioxide, ammonium octamolybdate (AOM), zirconium compounds, titanium compounds, zinc compounds such as zinc stannate, zinc hydroxy-stannate, mono zinc phosphate, as well as others.

The flame retarding component can be added the composition to suppress, reduce, delay, or modify the propagation of a flame through a composition or an article based on the composition. The flame retarding component can be halogenated hydrocarbons (chlorine and bromine containing compounds and reactive flame retardants), inorganic flame retardants (boron compounds, antimony oxides, aluminum hydroxide, molybdenum compounds, zinc and magnesium oxides), phosphorous containing compounds (organic phosphates, phosphinates, phosphites, phosphonates, phosphines, halogenated phosphorus compounds and inorganic phosphorus containing salts) and nitrogen containing compounds like melamine cyanurate.

Inorganic flame retardants can include metal hydroxides, antimony compounds, boron compounds, other metal compounds, phosphorous compounds, and other inorganic flame-retarding compounds. Examples of suitable metal hydroxides include magnesium hydroxide, aluminum hydroxide, and other metal hydroxides. Examples of suitable antimony-based flame retardants include antimony trioxide, sodium antimonate, antimony pentoxide, and other antimony-based inorganic compounds. Examples of suitable boron compounds include zinc borate, boric acid, borax, as well as other boron-based inorganic compounds. Examples of other metal compounds include molybdenum compounds, molybdenum trioxide, ammonium octamolybdate (AOM), zirconium compounds, titanium compounds, zinc compounds such as zinc stannate, zinc hydroxy-stannate, mono zinc phosphate, as well as others.

The flame retarding component can include halogen-containing compounds. Examples of suitable halogenated organic flame retardants can include brominated flame retardants and chlorinated flame retardants. Examples of such flame retardants include tetrabromobisphenol A, octabromobiphenyl ether, decabromodiphenyl ether, bis(tribromophenoxy)ethane, tetrabromobiphenyl ether, hexabromocyclododecane, tribromophenol, bis(tribromophenoxy)ethane tetrabromobisphenol A polycarbonate oligomers, and tetrabromobisphenol A epoxy oligomers. Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly (haloaryl acrylate), poly (haloaryl methacrylate), or mixtures thereof.

Examples of other suitable flame retardants are brominated polystyrenes such as polydibromostyrene and polytribromostyrene, decabromobiphenyl ethane, tetrabromobiphenyl, brominated alpha, omega-allylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins.

Chlorinated flame retardants include chlorinated paraffins, bis (hexachlorocyclopentadieno)cyclo-octane as well other such functionally equivalent materials.

The flame retarding component can include phosphorus-containing compounds. Examples of suitable phosphorous flame retardants include red phosphorus, ammonium polyphosphate. Organophosphorus flame retardants can include halogenated phosphates, non-halogenated compounds. Examples of such materials include tris(1-chloro-2-propyl) phosphate, tris(2-chloroethyl)phosphate, tris(2,3-dibromopropyl)phosphate, phosphate esters, trialkyl phosphates, triaryl phosphates, aryl-alkyl phosphates, and combinations thereof. Other flame retardants can include polyols, phosphonium derivatives, phosphonates, phosphanes, and phosphines.

Specific phosphorous-containing compounds include phosphates of the formula:

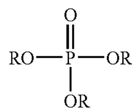

wherein each R is independently a $C_{1-18}$ allyl, cycloalkyl, aryl, or arylalkyl, e.g., cyclohexyl, isopropyl, isobutyl, and the like; phosphonates of the formula:

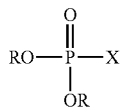

wherein X is H, and each R is independently a $C_{1-18}$ alkyl, cycloalkyl, aryl, or arylalkyl, e.g., cyclohexyl, isopropyl, isobutyl, and the like; phosphinates of the formula

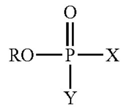

wherein X and Y is H, and R is a $C_{1-18}$ alkyl, cycloalkyl, aryl, or arylalkyl, e.g., cyclohexyl, isopropyl, isobutyl, and the like; phosphine oxides of the formula:

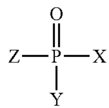

wherein X, Y, and Z are H and $R_1$ is a $C_{1-18}$ alkyl, cycloalkyl, aryl, arylalkyl, e.g., cyclohexyl, isopropyl, isobutyl, and the like; phosphines of the formula:

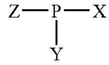

wherein X, Y, and Z is each independently a H, $C_{1-18}$ alkyl, cycloalkyl, aryl, arylalkyl, and the like; or a phosphite of the formula:

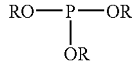

wherein each R is independently the same or different can be selected from the group of $C_{1-18}$ alkyl, cycloalkyl, aryl, or arylalkyl, e.g., cyclohexyl, isopropyl, isobutyl, and the like, and H.

As such, suitable flame retarding agents that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P{=}O$, wherein each G is independently an alkyl, cycloallyl, aryl, alkylaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis (2-ethylhexyl)p-tolyl phosphate, tritolyl phosphate, bis(2-ethylhexyl)phenyl phosphate, tri(nonylphenyl)phosphate, bis (dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like. Di- or polyfunctional aromatic phosphorus-containing compounds are also useful, for example, compounds of the formulas below:

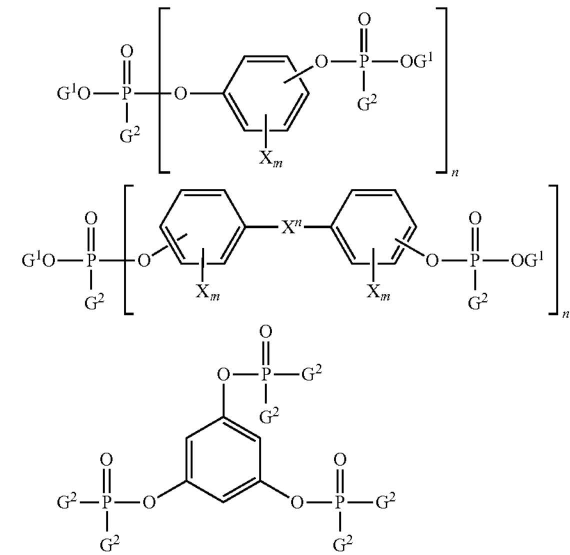

wherein each $G^1$ is independently a hydrocarbon having 1 to about 30 carbon atoms; each $G^2$ is independently a hydrocarbon or hydrocarbonoxy having 1 to about 30 carbon atoms; each $X_m$ is independently a bromine or chlorine; m is 0 to 4; and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl)phosphate of bisphenol-A, respectively, their oligomeric and polymeric counterparts, and the like.

Other exemplary suitable flame retarding compounds containing phosphorus-nitrogen bonds, include phosphonitrilic chloride, phosphorus ester amides, phosphoric acid amides, phosphonic acid amides, phosphinic acid amides, and tris (aziridinyl)phosphine oxide. When present, phosphorus-containing flame retardants are generally present in amounts of about 1 to about 20 parts by weight, based on 100 parts by weight of the total resin in the final composition.

In one embodiment, the flame retarding polyester composition includes a flame retarding quantity of one or a mixture of nitrogen-containing flame retardants such as triazines, guanidines, cyanurates, and isocyanurates. Suitable triazines have the formula

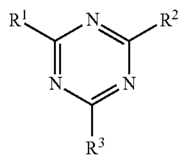

wherein $R^1$, $R^2$, and $R^3$ are independently $C_{1-12}$ alkyl, $C_{1-12}$ alkoxyl, $C_{6-12}$ aryl, amino, $C_{1-12}$ alkyl-substituted amino, or hydrogen. Highly suitable triazines include 2,4,6-triamine-1,3,5-triazine (melamine, CAS Reg. No. 108-78-1), melamine derivatives, melam, melem, melon, ammeline (CAS Reg. No. 645-92-1), ammelide (CAS Reg. No. 645-93-2), 2-ureidomelamine, acetoguanamine (CAS Reg. No. 542-02-9), benzoguanamine (CAS Reg. No. 91-76-9), and the like. Salts/adducts of these compounds with boric acid or phosphoric acid may be used in the composition. Examples include melamine pyrophosphate and melamine polyphosphate. Suitable cyanurate/isocyanurate compounds include salts/adducts of the triazine compounds with cyanuric acid, such as melamine cyanurate and any mixtures of melamine salts.

Suitable guanidine compounds include guanidine; aminoguanidine; and the like; and their salts and adducts with boric acid, carbonic acid, phosphoric acid, nitric acid, sulfuric acid, and the like; and mixtures comprising at least one of the foregoing guanidine compounds.

The nitrogen-containing flame retardants are often used in combination with one or more phosphorous-based compounds, for example the phosphinates and diphosphinates set forth in U.S. Pat. No. 6,255,371 to Schosser et al. Specific phosphinates include aluminum diethylphosphinate (DEPAL), and zinc diethylphosphinate (DEPZN). The phosphinates have the formula (18)

(18)

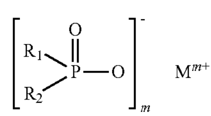

and/or formula (19), (19)

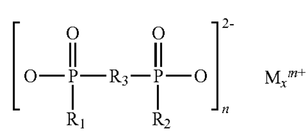

and/or polymers comprising units derived from formulas (18) or (19), wherein $R_1$ and $R_2$ are the same or different, and are H, $C_{1-6}$ alkyl (linear or branched), and/or aryl; $R_3$ is $C_{1-10}$ alkylene, (linear or branched), $C_{6-10}$ arylene, $C_{6-10}$ alkylarylene or $C_{6-10}$ arylalkylene; M is any metal, e.g., magnesium, calcium, aluminum or zinc, m is 1, 2 or 3; n is 1, 2 or 3; and x is 1 or 2. In one embodiment, $R_1$ and $R_2$ can be H. This results in a hypophosphite, a subset of phosphinate, such as calcium hypophosphite, aluminum hypophosphite, and the like.

The flame retardants are typically used with a synergist, particularly inorganic antimony compounds. Such compounds are widely available or can be made in known ways. Typical inorganic synergist compounds include $Sb_2O_5$, $SbS_3$, sodium antimonate, and the like. Especially suitable is antimony trioxide ($Sb_2O_3$). Synergists such as antimony oxides are typically used in an amount of about 0.5 to 15% by weight, based on the weight of resin in the final composition.

Also, the present composition may contain polytetrafluoroethylene (PTFE) type resins or copolymers, which are used either to reduce dripping in flame retardant thermoplastics or to form fibrillar network in the composition. In one embodiment the fluoropolymer is at least partially encapsulated by an encapsulating thermoplastic polymer, for example PTFE/SAN, synthesized by aqueous emulsion polymerization as disclosed in U.S. Pat. No. 5,804,654.

Flame retardant additives are desirably present in an amount at least sufficient to reduce the flammability of the polyester resin, preferably to a UL94 V-0 rating. The amount will vary with the nature of the resin and with the efficiency of the additive. The amount of the flame retarding component is generally at least 1 wt %, based on the weight of resin in the final composition. In one embodiment, the amount of the flame retarding component is from 5 wt % to 30 wt %, based on the weight of resin in the final composition. In another embodiment, the amount of the flame retarding component is from 0.01 to 20 wt %, or from 10 to 20 wt %, based on the weight of polymer in the final composition.

The carboxy-reactive material is a monofunctional or a polyfunctional carboxy-reactive material that can be either polymeric or non-polymeric. Examples of carboxy-reactive groups include epoxides, carbodiimides, orthoesters, oxazolines, oxiranes, aziridines, and anhydrides. The carboxy-reactive material can also include other functionalities that are either reactive or non-reactive under the described processing conditions. Non-limiting examples of reactive moieties include reactive silicon-containing materials, for example epoxy-modified silicone and silane monomers and polymers. If desired, a catalyst or co-catalyst system can be used to accelerate the reaction between the carboxy-reactive material and the polyester.

The term "polyfunctional" or "multifunctional" in connection with the carboxy-reactive material means that at least two carboxy-reactive groups are present in each molecule of the material. Particularly useful polyfunctional carboxy-reactive materials include materials with at least two reactive epoxy groups. The polyfunctional epoxy material can contain aromatic and/or aliphatic residues. Examples include epoxy novolac resins, epoxidized vegetable (e.g., soybean, linseed) oils, tetraphenylethylene epoxide, styrene-acrylic copolymers containing pendant glycidyl groups, glycidyl methacrylate-containing polymers and copolymers, and difunctional epoxy compounds such as 3,4-epoxycyclohexylmethyl-3,4-epoxycyclohexanecarboxylate.

In one embodiment, the polyfunctional carboxy-reactive material is an epoxy-functional polymer, which as used herein include oligomers. Exemplary polymers having multiple epoxy groups include the reaction products of one or more ethylenically unsaturated compounds (e.g., styrene, ethylene and the like) with an epoxy-containing ethylenically unsaturated monomer (e.g., a glycidyl $C_{1-4}$ (alkyl)acrylate, allyl glycidyl ethacrylate, and glycidyl itoconate).

For example, in one embodiment the polyfunctional carboxy-reactive material is a styrene-acrylic copolymer (including an oligomer) containing glycidyl groups incorporated as side chains. Several useful examples are described in the International Patent Application WO 03/066704 A1, assigned to Johnson Polymer, LLC, which is incorporated herein by reference in its entirety. These materials are based on copolymers with styrene and acrylate building blocks that have glycidyl groups incorporated as side chains. A high number of epoxy groups per polymer chain is desired, at least about 10, for example, or greater than about 15, or greater than about 20. These polymeric materials generally have a molecular weight greater than about 3000, preferably greater than about 4000, and more preferably greater than about 6000. These are commercially available from BASF under the Joncryl® trade name, preferably the Joncryl® ADR 4368 material.

Another example of a carboxy-reactive copolymer is the reaction product of an epoxy-functional $C_{1-4}$(alkyl)acrylic monomer with a non-functional styrenic and/or $C_{1-4}$(alkyl) acrylate and/or olefin monomer. In one embodiment the epoxy polymer is the reaction product of an epoxy-functional (meth)acrylic monomer and a non-functional styrenic and/or (meth)acrylate monomer. These carboxy reactive materials are characterized by relatively low molecular weights. In another embodiment, the carboxy reactive material is an epoxy-functional styrene (meth)acrylic copolymer produced from an epoxy functional (meth)acrylic monomer and styrene. As used herein, the term "(meth)acrylic" includes both acrylic and methacrylic monomers, and the term "(meth) acrylate includes both acrylate and methacrylate monomers. Examples of specific epoxy-functional (meth)acrylic monomers include, but are not limited to, those containing 1,2-epoxy groups such as glycidyl acrylate and glycidyl methacrylate.

Suitable $C_{1-4}$ (alkyl)acrylate comonomers include, but are not limited to, acrylate and methacrylate monomers such as methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Combinations comprising at least one of the foregoing comonomers can be used.

Suitable styrenic monomers include, but are not limited to, styrene, alpha-methyl styrene, vinyl toluene, p-methyl styrene, t-butyl styrene, o-chlorostyrene, and mixtures comprising at least one of the foregoing. In certain embodiments the styrenic monomer is styrene and/or alpha-methyl styrene.

In another embodiment, the carboxy reactive material is an epoxy compound having two terminal epoxy functionalities, and optionally additional epoxy (or other) functionalities. The compound can further contain only carbon, hydrogen, and oxygen. Difunctional epoxy compounds, in particular those containing only carbon, hydrogen, and oxygen can have a molecular weight of below about 1000 g/mol, to facilitate blending with the polyester resin. In one embodiment the difunctional epoxy compounds have at least one of the epoxide groups on a cyclohexane ring. Exemplary difunctional epoxy compounds include, but are not limited to, 3,4-epoxycyclohexyl-3,4-epoxycyclohexyl carboxylate, bis(3,4-epoxycyclohexylmethyl)adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl)adipate, butadiene diepoxide, vinylcyclohexene diepoxide, dicyclopentadiene diepoxide, and the like. Especially preferred is 3,4-epoxycyclohexyl-3,4 epoxycyclohexylcarboxylate.

The difunctional epoxide compounds can be made by techniques well known to those skilled in the art. For example, the corresponding α- or β-dihydroxy compounds can be dehydrated to produce the epoxide groups, or the corresponding unsaturated compounds can be epoxidized by treatment with a peracid, such as peracetic acid, in well-known techniques. The compounds are also commercially available.

Other preferred materials with multiple epoxy groups are acrylic and/or polyolefin copolymers and oligomers containing glycidyl groups incorporated as side chains. Suitable epoxy-functional materials are available from Dow Chemical Company under the tradename D.E.R.332, D.E.R.661, and D.E.R.667; from Resolution Performance Products under the trade name EPON Resin 1001F, 1004F, 1005F, 1007F, and 1009F; from Shell Oil Corporation under the trade names EPON 826, 828, and 871; from Ciba-Giegy Corporation under the trade names CY-182 and CY-183; and from Dow Chemical Co. under the tradename ERL-4221 and ERL-4299. As set forth in the Examples, BASF is a supplier of an epoxy functionalized material known as ADR4368 and 4300. A further example of a polyfunctional carboxy-reactive material is a co- or terpolymer including units of ethylene and glycidyl methacrylate (GMA), sold by Arkema under the trade name LOTADER®.

In still another embodiment, the carboxy-reactive material is a multifunctional material having two or more reactive groups, wherein at least one of the groups is an epoxy group and at least one of the groups is a group reactive with the polyester, but is not an epoxy group. The second reactive group can be a hydroxyl, an isocyanate, a silane, and the like.

Examples of such multifunctional carboxy-reactive materials include materials with a combination of epoxy and silane functional groups, preferably terminal epoxy and silane groups. The epoxy silane is generally any kind of epoxy silane wherein the epoxy is at one end of the molecule and attached to a cycloaliphatic group and the silane is at the other end of the molecule. A desired epoxy silane within that general description is of the following formula:

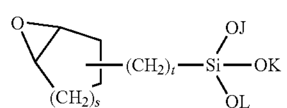

wherein s is an integer of 1, 2 or 3, t is an integer of 1 to 6, inclusive, and J, K, and L are the same or different, preferably the same, and are alkyl groups of one to twenty carbon atoms, inclusive, cycloalkyl of four to ten carbon atoms, inclusive, alkylene phenyl wherein alkylene is one to ten carbon atoms, inclusive, and phenylene alkyl wherein alkyl is one to six carbon atoms, inclusive. Desirable epoxy silanes within this range are compounds wherein s is 2, t is 1 or 2, desirably 2, and J, K, and L are the same and are alkyl of 1, 2, or 3 carbon atoms inclusive. Epoxy silanes within the range which in particular can be used are those wherein s is 2, t is 2, and J, K, and L are the same and are methyl or ethyl.

Such materials include, for example, β-(3,4-epoxycyclohexyl)ethyltriethoxysilane, available under the trade name CoatOSil 1770 from Momentive Performance Materials, Inc. Other examples are β-(3,4-epoxycyclohexyl)ethyltrimethoxysilane, available under the trade name Silquest A-186 from Momentive Performance Materials, Inc, and 3-glycidoxypropyltriethoxysilane, available under the trade name Silquest Y-15589 from Momentive Performance Materials, Inc.

The carboxy-reactive material is added to the polyester compositions in amounts effective to improve visual and/or measured physical properties. In one embodiment, the carboxy-reactive materials are added to the polyester compositions in an amount effective to improve the solvent resistance of the composition, in particular the fuel-resistance of the composition. A person skilled in the art can determine the optimum type and amount of any given carboxy-reactive material without undue experimentation, using the guidelines provided herein.

The type and amount of the carboxy reactive material will depend on the desired characteristics of the composition, the type of polyester used, the type and amount of other additives present in the composition and like considerations, and is generally at least 0.01 wt % based on the weight of the total composition. In one embodiment, the amount of the carboxy-reactive material is 0.01 to 30 wt %, or more, specifically 0.01 to 20 wt %, 1 to 10 wt %, more specifically 1 to 5 wt %, based on the total polymer.

The blends are made by combining suitable amounts of the copolyetheresters and the polycarbonate. In one embodiment, the process involves making a copolyetherester by either process described above and further adding a polycarbonate in sufficient amounts to form the blend. More particularly, in one embodiment, the ingredients can be tumble-blended and then compounded on a twin screw extruder with vacuum vented co-rotating mixing screws. The temperature can be set at a suitable temperature, e.g., from 200 to 250° C. and screw speed between a setting such as 400 and 450 rpm. The extrudate is cooled through a water bath prior to pelletization. The typical output rate for the extruder is about 50 lbs/hr (approximately 127 kg/hour). Other outputs are possible.

The compositions can be molded or extruded to form an article. In another embodiment, a method of forming an article comprises shaping, extruding, blow molding, or injection molding any of the compositions encompassed by the invention. In one embodiment, the articles are transparent.

Further, the process for making the elastomer blends can advantageously substantially reduce carbon dioxide emissions and solid waste. Since the elastomer blends are made from scrap PET and not monomers, the process significantly reduces the amount of carbon dioxide emissions and solid waste. Carbon waste reduction (or crude oil savings) occurs because the carbon that constitutes the dimethyl terephthalate or terephthalic acid ordinarily used to make polyesters is substituted by a scrap PET component, e.g., polyester scrap. The process to make DMT or TPA from crude oil is highly energy intensive and as a result, substantial emissions of carbon dioxide ($CO_2$) to the atmosphere occurs from burning of non-renewable energy sources. By not using DMT or TPA to make the PET-derived modified PBT, carbon dioxide emissions savings are obtained. In one embodiment, the process for making PET-derived modified PBT can eliminate at least 1 kg of $CO_2$ emissions for every kilogram of PET-derived modified PBT made with the process, as compared to a process that makes virgin PBT homopolymers from monomers. In another embodiment, the process for making PET-derived modified PBT can eliminate from 1 kg to 1.5 kg, or more $CO_2$ emissions for every kilogram of PET-derived modified PBT made with the inventive process, as compared to a process that makes virgin PBT homopolymers from monomers. Additionally, there are energy savings and reduced carbon dioxide emissions when the ethylene glycol byproduct is recovered and is used instead of ordinary ethylene glycol in manufacturing.

Additionally, when the source of BDO is from biomass-derived feedstocks such as succinic acid, the carbon dioxide savings are further increased for two reasons. Biomass-derived succinic acid is made form sugars or other biomass-derived hydrocarbons that are derived from atmospheric carbon rather than fossil fuel carbon sources, thus reducing the environmental impact of the polymer derived from BDO using succinic acid from biomass sources. Furthermore, the fermentation to yield succinic acid requires carbon dioxide as an input thus leading to further carbon dioxide reductions.

Advantageously, modified polybutylene terephthalate random copolymers can have a reduced $CO_2$ emissions index. The reduced $CO_2$ emissions index, as defined in this application, is the amount of $CO_2$, expressed in kilogram (kg), that is saved when one (1) kg of a composition containing the modified polybutylene terephthalate random copolymers is made, as compared to the amount of $CO_2$, expressed in kg, that is created when the composition is made with polybutylene terephthalate that is derived from monomers. Generally, the modified PBT random copolymers have a reduced $CO_2$ emissions index that is more than approximately 1.3 kg, and can range from 1.3 kg to 2.5 kg.

The basis for this feature is discussed below. The difference between the amount of $CO_2$ that is created during ordinary processes for making virgin, monomer-derived PBT and the process for making 1 kg of the modified polybutylene terephthalate random copolymers can range from 1.3 kg to 2.5 kg, or more particularly from 1.7 kg to 2.2 kg. This difference is based on calculations for the entire process that starts from crude oil to the monomers to the PBT, versus the process of converting scrap PET to oligomers to the modified PBT. In other words, the process for making 1 kg of the modified polybutylene terephthalate random copolymers creates 1.3 to 2.5 kilograms less $CO_2$ as compared to the process for making 1 kg of virgin PBT from crude oil.

These results can be derived and verified by using material and energy balance calculations (calculations that are well know in the chemical engineering art) and comparing the amount of energy used to make modified PBT random copolymers from PET and the amount of energy used to make PBT from the monomer terephthalic acid.

The invention is further illustrated by the following non-limiting Examples.

EXAMPLES

The following materials were used as the starting materials for the blends.

Each of the thermoplastic polyether-ester (TPEE) elastomers: experimental materials "TPEE-1" and "TPEE-2," was an elastomer containing a modified, random polybutylene terephthalate copolymer block that was derived from a polyethylene terephthalate component and that comprises a residue derived from the polyethylene terephthalate component; and a polyalkylene oxide copolymer block that was derived from a polyethylene terephthalate component and a polyalkylene oxide glycol, and that contains polyalkylene oxide groups and a residue derived from the polyethylene terephthalate component. Both elastomers were derived from post consumer polyethylene terephthalate (PET)

Table 1 shows intrinsic viscosity (IV), the melt temperature of the polyester component, Tm, in degrees Centigrade (° C.), and the glass transition temperature of the polyester component, Tg, in ° C., as measured by DSC. Table 1 also shows the composition as measured by NMR (see section Testing Protocols/Techniques/Procedures). PTHF stands for poly(oxytetramethylene)glycol, which constitutes the so-called soft blocks in these elastomers.

TABLE 1

| Description | Unit | TPEE-1 TPEE derived from PET | TPEE-2 TPEE derived from PET |
|---|---|---|---|
| IV | dL/g | 1.03 | 1.26 |
| Tm | ° C. | 158 | 167 |
| Tc | ° C. | 87 | 109 |
| Co-Polyether, PTHF | wt % | 51 | 50 |
| Co-Polyester, PBT | wt % | 49 | 50 |
| Co-Polyester, PET | wt % | 0.1 | 0.3 |
| Terephthalate vs. Isophthalate in PBT | mol % | 84 | 88 |
| Isophthalate vs. terephthalate in PBT | mol % | 16 | 12 |
| Degree of polymerization in PTHF | DP | 10.8 | 10.5 |
| Degree of polymerization in PBT | DP | 4 | 4.1 |

Polycarbonates: LEXAN® 101 polycarbonate; polycarbonate comprising 50 weight percent 1,1-bis(4-hydroxy-3-methylphenyl)cyclohexane (DMBPC); polysiloxane-polycarbonate, all from General Electric.

Polyester: poly 1,4-cyclohexylenedimethylene-1,4-cyclohexanedicarboxylate (PCCD) with an IV between 0.92 and 1.02, from Eastman Chemical Company.

Additives: Sandostab PEPQ from Clariant; Mono Zinc Phosphate (MZP) from Budenheim.

Preparation Procedures—Compositions

The compositions were prepared with the ingredients tumble-blended and then compounded on a 27 mm Werner Pfleiderer Twin Screw Extruder with vacuum vented co-rotating mixing screws. The temperature was set at 200° C. to 250° C. and screw speed between 400 and 450 revolutions per minute (rpm). The extrudate was cooled through a water bath prior to pelletization. The typical output rate for this extruder was about 50 lbs/hr (23 kg/hr).

Sample Testing

Chemical composition of the TPEE elastomers was determined with NMR Spectroscopy. A Varian Mercury NMR spectrometer (400 MHz) was utilized for these measurements. Samples were dissolved in $CDCl_3$/TFA-d (7:3 v/v) between 40 and 50 mg/ml.

Haze and total luminous transmittance (%) were each measured on ASTM D1003-00. The following classification is used as a guideline for samples of 3.2 mm thickness: Transmission greater than 60% is classified as transparent, Transmission greater than or equal to 35% is classified as translucent, and Transmission less than 35% is classified as opaque.

Vicat softening temperature (VST) is measured according to the standard ASTM D1525 or ISO 306 test method. The sample is subject to 10N and the heating rate for the test is 50° C./hour.

Melt volume flow ratio (MVR) was measured at the indicated temperature (250° C.) under a load of 1.20 Kg in accordance with ISO 1133. MVR is reported in cubic centimeters per 10 minutes ($cm^3$/10 min).

Flexural modulus is based on the ASTM D790 method. Typical articles used were injection molded articles. More specifically, injection molded test bars had the following dimensions: ⅛ inch (3.175 mm)×inch×5 inches (127 mm). The final test results were calculated as the average of test results of five test bars. The flexural modulus is the ratio, within the elastic limit, of stress to corresponding strain and is expressed in Megapascals (MPa).

Izod impact strength was measured at room temperature according to ASTM D 256 using molded bars having dimensions of ⅛ inch (3.175 mm)×½ inch (12.7 mm)×2½ inches (63.5 mm). The results of the test are reported in terms of energy absorbed per unit specimen width, expressed in Joule/m (J/m). Typically the final test result was calculated as the average of test results of five test bars.

Tensile performance data were measured according to ASTM D638 for Low-Modulus materials. This test method was used to determine the tensile properties of low-modulus plastic, ASTM Type I, injection molded articles (dumbbell-shaped bars). The test had an initial speed of one inch (2.54 cm) per minute and after 50% strain increases to two inches per minute. The test ran until the sample breaks or until the extensometer reached its extension limit of 400%. Tensile Modulus, Stress at 5% Strain, Stress at 10% Strain, Stress at 50% Strain, Stress at Maximum Strain, and Nominal Strain at Break are reported.

Multi-axial impact performance data were measured according to ASTM D3763 at 0 and 23° C. The test provides information on how a material behaved under multiaxial deformation conditions. The deformation applied was a high-speed puncture. Results are expressed in Joules as total impact energy.

Examples 1-4

The purpose of these Examples was to show different embodiments of the invention, namely opaque compositions and transparent compositions. Examples 1-2 were exemplary opaque compositions and Examples 3-4 were exemplary transparent compositions.

Results (Examples 1-2)

The results for Examples 1-2 are shown in Table 2. More specifically, the examples were blends containing an elastomer that included a modified, random polybutylene terephthalate copolymer block that was derived the polyethylene terephthalate component and that comprises a residue derived from the polyethylene terephthalate component; and a polyalkylene oxide copolymer block that was derived from the polyethylene terephthalate component and a polyalkylene oxide glycol, and that contained polyalkylene oxide groups and a residue derived from the polyethylene terephthalate component.

TABLE 2

| Description | Unit | Ex. 1 | Ex. 2 |
|---|---|---|---|
| TPEE-1, TPEE with 16 wt % isophthalate | % | 50 | |
| TPEE-2, TPEE with 12 wt % isophthalate | % | — | 50 |
| Polycarbonate | % | 49.7 | 49.7 |
| Phosphonous Acid Ester (PEPQ) | % | 0.2 | 0.2 |
| Mono Zinc Phosphate (MZP) | % | 0.1 | 0.1 |
| Total | % | 100 | 100 |
| Transmission | % | 15 | 21 |
| Haze | % | 99 | 97 |
| Melt Volume-flow Rate (MVR) - ISO 1133, at 250° C./1.2 kg | $cm^3$/10 min | 8 | 28 |
| Flexural Modulus | MPa | 960 | 910 |
| Flex Stress at 5% Strain | MPa | 34.6 | 31.4 |
| Flexural Stress at Yield | MPa | 36.8 | 32.7 |
| Flexural Stress at Break | MPa | No break | No break |
| Izod Impact - ASTM D256, at 23° C. | J/m | 890 | 890 |
| Tensile Modulus | MPa | 1210 | 1680 |
| Tensile Stress at 5% Strain | MPa | 29.1 | 27.5 |
| Tensile Stress at 10% Strain | MPa | 27.9 | 25.5 |
| Tensile Stress at 50% Strain | MPa | 25.1 | 21.3 |
| Tensile Stress at Break | MPa | 43.3 | 40.7 |
| Nominal Tensile Strain at Break | % | 210 | 240 |
| Vicat softening temperature (VST), ASTM D 1525 | ° C. | 84 | 68 |
| Multi-axial Impact - ASTM D3763, at 23° C., Total Energy | J | 46 | 48 |
| Multi-axial Impact - ASTM D3763, at 0° C., Total Energy | J | 52 | 52 |

The results indicate that the compositions of Examples 1 and 2 are both classified as opaque based on the transmission data (15 and 21%, respectively). The results also indicate that the compositions exhibited useful performance properties.

Results (Examples 3-4)

With respect to Examples 3 and 4, Table 3 illustrated the compositions and properties of Examples 3 and 4 of the invention. The compositions comprised PET derived elastomers and PC copolymer, specifically DMBPC.

TABLE 3

| Item Description | Unit | Ex. 3 | Ex. 4 |
|---|---|---|---|
| TPEE with 16 wt % isophthalate | % | 52 | |
| TPEE with 12 wt % isophthalate | % | — | 52 |
| DMBPC-BPA Copolycarbonate (25,000 Mw, 50% DMBPC) | % | 47.7 | 47.7 |
| Phosphonous Acid Ester (PEPQ) | % | 0.2 | 0.2 |
| Mono Zinc Phosphate (MZP) | % | 0.1 | 0.1 |
| Total | % | 100 | 100 |
| Transmission | % | 66 | 64 |
| Haze | % | 17 | 15 |
| Melt Volume-flow Rate (MVR) - ISO 1133, at 250° C./1.2 kg | $cm^3$/10 min | 13 | 45 |
| Flexural Modulus | MPa | 284 | 421 |
| Flex Stress at 5% Strain | MPa | 10 | 15.1 |
| Flexural Stress at Yield | MPa | 11.5 | 16.6 |
| Flexural Stress at Break | MPa | No break | No break |
| Izod Impact - ASTM D256, at 23° C. | J/m | 1170 | 1180 |
| Tensile Modulus | MPa | 505 | 979 |
| Tensile Stress at 5% Strain | MPa | 14.5 | 18.5 |
| Tensile Stress at 10% Strain | MPa | 15.7 | 18.8 |
| Tensile Stress at 50% Strain | MPa | 15.6 | 16.9 |
| Tensile Stress at Break | MPa | 37.3 | 31.3 |
| Nominal Tensile Strain at Break | % | 350 | 290 |
| Vicat softening temperature (VST), ASTM D 1525 | ° C. | 55.6 | 55.4 |
| Multi-axial Impact - ASTM D3763, at 23° C., Total Energy | J | 56 | 41 |
| Multi-axial Impact - ASTM D3763, at 0° C., Total Energy | J | 58 | 56 |

The transmission of Ex. 3 is 66% and that of Ex. 4 is 64%, which classified both materials as transparent.

Examples 5-6

The purpose of Examples 5 and 6 was to show examples of ternary blends, compositions containing three polymers. The results are shown in Table 4

TABLE 4

| Description | Unit | Ex. 5 | Ex. 6 |
|---|---|---|---|
| TPEE with 16 wt % isophthalate | % | 21.9 | |
| TPEE with 12 wt % isophthalate | % | | 21.9 |
| DMBPC-BPA Copolycarbonate (25 Kilodaltons Mw, 50% DMBPC) | % | 32.8 | 32.8 |
| PCCD | % | 45 | 45 |
| Phosphonous Acid Ester (PEPQ) | % | 0.2 | 0.2 |
| Mono Zinc Phosphate (MZP) | % | 0.1 | 0.1 |
| Total | % | 100 | 100 |
| Transmission | % | 66 | 76 |
| Haze | % | 13 | 6.8 |
| Melt Volume-flow Rate (MVR) - ISO 1133, at 250° C./1.2 kg | $cm^3$/10 min | 8.4 | 17 |
| Flexural Modulus | MPa | 1200 | 1140 |
| Flex Stress at 5% Strain | MPa | 45.7 | 42.7 |
| Flexural Stress at Yield | MPa | 47.4 | 44.2 |
| Flexural Stress at Break | MPa | no break | no break |
| Izod Impact - ASTM D256, at 23° C. | J/m | 113 | 82.3 |
| Tensile Modulus | MPa | 1540 | 2770 |
| Tensile Stress at 5% Strain | MPa | 36.9 | 36.1 |
| Tensile Stress at 10% Strain | MPa | 30.7 | 29.9 |
| Tensile Stress at 50% Strain | MPa | 25 | 21.8 |
| Tensile Stress at Break | MPa | 39 | 36 |
| Nominal Tensile Strain at Break | % | 230 | 240 |
| Vicat softening temperature (VST) - ASTM D 1525 | ° C. | 68 | 55.7 |
| Multi-axial Impact - ASTM D3763, at 23° C., Total Energy | J | 58 | 54 |
| Multi-axial Impact - ASTM D3763, at 0° C., Total Energy | J | 61 | 53 |

The results indicated that the compositions of Examples 5 and 6 were both classified as opaque based on the transmission data (66 and 76%, respectively). The results also indicate that the compositions exhibited useful performance properties.

The results indicated that the composition of Examples 1 and 2 were both classified as transparent, with a transmission of 66%. The results also indicated that the compositions exhibited useful performance properties.

Examples 7-8

The purpose of these Examples was to show that our compositions could exhibit translucent properties. In Table 5 further examples of the invention are given. The compositions include PET derived elastomers and polysiloxane-polycarbonate copolymers.

TABLE 5

| Item Description | Unit | Ex. 7 | Ex. 8 |
|---|---|---|---|
| TPEE with 16 wt % isophthalate | % | 50 | |
| TPEE with 12 wt % isophthalate | % | | 50 |
| Transparent PC-Siloxane Co-polymer | % | 49.7 | 49.7 |
| Phosphonous Acid Ester (PEPQ) | % | 0.2 | 0.2 |
| Mono Zinc Phosphate (MZP) | % | 0.1 | 0.1 |
| Total | % | 100 | 100 |
| Transmission | % | 40 | 48 |
| Haze | % | 70 | 42 |
| Melt Volume-flow Rate (MVR) - ISO 1133, at 250° C./1.2 kg | $cm^3$/10 min | 9.7 | 44 |
| Flexural Modulus | MPa | 530 | 600 |
| Flex Stress at 5% Strain | MPa | 19 | 21.5 |
| Flexural Stress at Yield | MPa | 20.9 | 23.2 |
| Flexural Stress at Break | MPa | no break | no break |
| Izod Impact - ASTM D256, at 23° C. | J/m | 950 | 1000 |
| Tensile Modulus | MPa | 711 | 1642 |
| Tensile Stress at 5% Strain | MPa | 18 | 20.7 |
| Tensile Stress at 10% Strain | MPa | 18.8 | 19.8 |
| Tensile Stress at 50% Strain | MPa | 17.3 | 17.1 |
| Tensile Stress at Break | MPa | 38.7 | 31.3 |
| Nominal Tensile Strain at Break | % | 350 | 300 |

TABLE 5-continued

| Item Description | Unit | Ex. 7 | Ex. 8 |
|---|---|---|---|
| Vicat softening temperature (VST) - ASTM D 1525 | ° C. | 70.5 | 65.1 |
| Multi-axial Impact - ASTM D3763, at 23° C., Total Energy | J | 46 | 39 |
| Multi-axial Impact - ASTM D3763, at 0° C., Total Energy | J | 49 | 47 |

The results indicated that the composition of Examples 7 and 8 were both classified as translucent with a transmission values of 40 and 48% respectively Although the present invention has been described in detail with reference to certain preferred versions thereof, other variations are possible. Therefore, the spirit and scope of the appended claims should not be limited to the description of the versions contained therein.

What is claimed is:

1. A composition comprising from 50 to 55 weight percent of a copolyetherester elastomer comprising:

a modified, random polybutylene terephthalate copolymer block that is derived from a polyethylene terephthalate component selected from the group consisting of polyethylene terephthalate, polyethylene terephthalate copolymers, and combinations thereof; and that contains at least one residue derived from the polyethylene terephthalate component; and a polybutylene oxide copolymer block that is derived from the polyethylene terephthalate component and poly(1,4-butylene oxide) glycol, and that contains poly(1,4-butylene oxide) and at least one residue derived from the polyethylene terephthalate component;

wherein the copolyetherester elastomer comprises 30 to 60 weight percent of units derived from poly(1,4-butylene oxide) glycol, based on the weight of the copolyetherester elastomer, and 5 to 40 mole percent isophthalic acid units, based on the total number of terephthalic acid units and isophthalic acid units in the copolyetherester elastomer;

from 45 to 50 weight percent of a polycarbonate of the formula

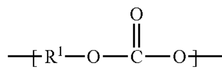

wherein at least 60 percent of the total number of $R^1$ groups are aromatic organic radicals and the balance thereof are aliphatic, alicyclic, or aromatic radicals, and wherein the polycarbonate further comprises repeating structural units of the formula

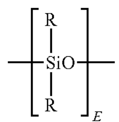

wherein each R is independently at each occurrence a monovalent organic radical having 1 to 13 carbon atoms, and E is an integer greater than or equal to 2;

wherein the at least one residue derived from the polyethylene terephthalate component comprises diethylene glycol groups in an amount ranging from 0.1 to 10 mole %, based on 100 mole % of glycol functionality in the copolyetherester elastomer; and wherein an article molded from the composition and having a thickness of 3.2 mm has a transmission of 35% or higher, measured in accordance with ASTM D1003-00.

2. The composition of claim 1, wherein the polycarbonate comprises repeating polysiloxane units of the formula

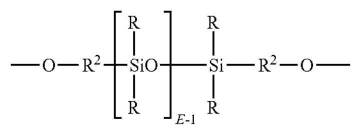

wherein each R is independently the same or different $C_{1-13}$ monovalent organic group, each $R^2$ is independently the same or different divalent $C_{1-30}$ organic group, and E is an integer having an average value of 2 to 1,000.

3. The composition of claim 1, wherein the polysiloxane units are of formula

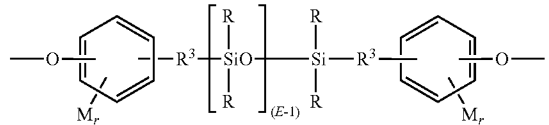

wherein R is independently the same or different $C_{1-3}$ monovalent organic group, $R^3$ is a $C_{2-8}$ divalent aliphatic group, M is independently at each occurrence a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy group, wherein each r is independently 0, 1, 2, 3, or 4.

4. The composition of claim 3, comprising $R^1$ groups derived from a bisphenol of the formula

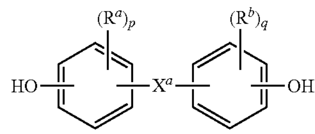

wherein $R^a$ and $R^b$ are each independently a halogen or a $C_{1-12}$ alkyl, $X^a$ is a single bond, —O—, —S—, —S(O)—, —$S(O)_2$—, —C(O)—, or a $C_{1-18}$ organic group, and p and q are each independently 0 to 4.

5. The composition of claim 4, wherein $X^a$ is isopropylidene and p and q are each zero.

6. The composition of claim 1, wherein the poly(1,4-butylene oxide) is derived from a poly(1,4-butylene oxide) glycol component having a number average molecular weight of 100 to 5000 Daltons and a poly(1,4-butylene oxide) glycol component having a molecular weight of less than 2500 Daltons.

7. The composition of claim 1, wherein the at least one residue derived from the polyethylene terephthalate component further comprises a residue selected from the group consisting of ethylene glycol groups, isophthalic acid groups, cobalt-containing compounds, antimony-containing compounds, germanium-containing compounds, tin-containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the trans isomer of 1,3-cyclohexane dimethanol, the trans isomer of 1,4-cyclohexane dimethanol, alkali salts, alkaline salts, naphthalene dicarboxylic acids, 1,3-propane diol groups, and combinations thereof.

8. The composition of claim 7, wherein the at least one residue derived from the polyethylene terephthalate component comprises a residue selected from the group consisting of ethylene glycol groups, isophthalic acid groups, the cis isomer of 1,3-cyclohexane dimethanol, the trans isomer of 1,3-cyclohexane dimethanol, the cis isomer of 1,4-cyclohexane dimethanol, the trans isomer of 1,4-cyclohexane dimethanol, and combinations thereof.

9. The composition of claim 8, wherein the at least one residue derived from the polyethylene terephthalate component comprises a residue selected from the group consisting of the cis isomer of 1,3-cyclohexane dimethanol, the cis isomer of 1,4-cyclohexane dimethanol, the trans isomer of 1,3-cyclohexane dimethanol, the trans isomer of 1,4-cyclohexane dimethanol, and combinations thereof.

10. The composition of claim 1, wherein the at least one residues derived from the polyethylene terephthalate component comprises a combination of ethylene glycol groups, diethylene glycol groups, and cobalt-containing compounds.

11. The composition of claim 1, wherein the at least one residue derived from the polyethylene terephthalate component comprises a combination of an ethylene glycol group and the diethylene glycol group.

12. The composition of claim 1, wherein the at least one residue derived from the polyethylene terephthalate component further comprises a residue selected from the group consisting of ethylene glycol groups and cyclohexane dimethanol groups and is in an amount from 0.1 to 10 mole %, based on 100 mole % of glycol in the composition.

13. The composition of claim 1, wherein the composition further comprises a polyester of the formula

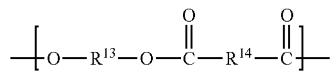

wherein $R^{13}$ and $R^{14}$ are independently at each occurrence an aryl, aliphatic or cycloaliphatic group having 2 to 20 carbon atoms and chemical equivalents thereof, with the proviso that at least one of $R^{13}$ and $R^{14}$ is a cycloaliphatic group, and wherein the amount of polyester ranges from 1 to 50 weight percent.

14. The composition of claim 13, wherein the cycloaliphatic group is independently selected from groups of the formulae

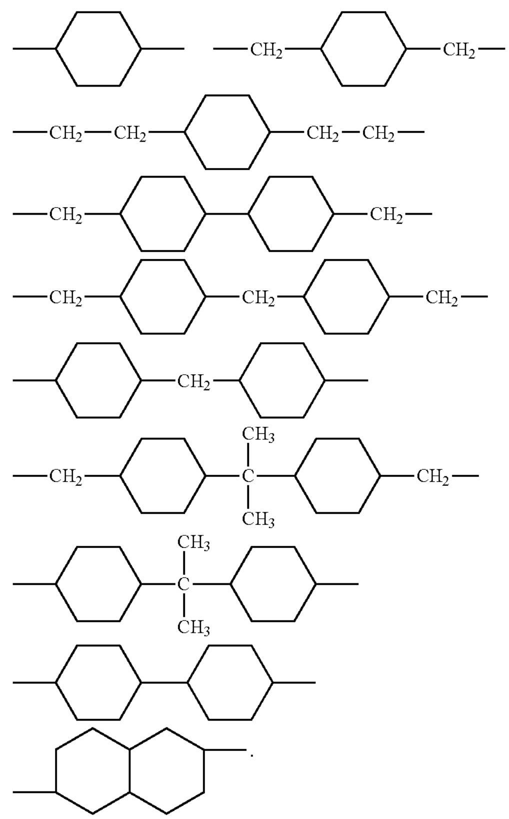

15. The composition of claim 13, wherein the polyester is poly(cyclohexane-1,4-dimethylene cyclohexane-1,4-dicarboxylate).

16. The composition of claim 1, wherein the composition further comprises from 0.1 to 5 weight percent of a carboxy reactive component.

17. The composition of claim 1, wherein the composition further comprises a flame retardant.

18. An article molded or extruded from the composition of claim 1.

19. A process for making an article, comprising molding or extruding the composition of claim 1.

20. A process for making the copolyetherester elastomer composition of claim 1, comprising combining the components of claim 1.

21. A process for making the copolyetherester elastomer of the composition of claim 1, the process comprising:

combining the polyethylene terephthalate component, 1,4-butane diol, and a catalyst in a reactor in a liquid phase under agitation;

depolymerizing the polyethylene terephthalate component by reacting the polyethylene terephthalate component and the 1,4-butane diol under at least atmospheric pressure and an inert atmosphere, under conditions sufficient to depolymerize the polyethylene terephthalate component into a molten mixture containing oligomers, 1,4-butane diol, ethylene glycol, and mixtures thereof, while refluxing the 1,4-butane diol back into the reactor; and agitating the molten mixture under subatmospheric pressure and removing excess diol, ethylene glycol, and tetrahydrofuran; and adding the poly(1,4-butylene oxide) glycol during the process in an amount and under conditions that are sufficient to form the copolyetherester elastomer.

22. The process of claim 21, wherein the 1,4-butane diol, the poly(1,4-butylene oxide) glycol, or a combination thereof is derived from biomass.

23. The process of claim 22, wherein the biomass is selected from the group consisting of grains and cellulosic containing materials.

24. A process for making the copolyetherester elastomer of the composition of claim 1, the process comprising:

depolymerizing the polyethylene terephthalate component by agitating the polyethylene terephthalate component with a member selected from the group consisting of ethylene glycol, 1,3-propane diol, and combinations thereof, in a reactor under at least atmospheric pressure in the presence of a catalyst component under conditions sufficient to depolymerize the polyethylene terephthalate component into a first molten mixture that comprises components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, 1,3-propane diol, and combinations thereof;

adding 1,4-butane diol to the first molten mixture in a reactor in the presence of a catalyst component, under conditions sufficient to form a second molten mixture containing a component selected from the group consisting of oligomers containing ethylene terephthalate moieties, oligomers containing trimethylene terephthalate moieties, 1,3-propane diol, ethylene glycol, and combinations thereof;

subjecting the second molten mixture to subatmospheric conditions and agitation sufficient to form the copolyetherester elastomer; and adding the poly(1,4-butylene oxide) glycol during the process in an amount and under conditions that are sufficient to form the copolyetherester and oligomers containing trimethylene terephthalate moieties, 1,3-propane diol, and ethylene glycol are removed during formation of the copolyetherester elastomer.

25. The process of claim 24, wherein the 1,4-butane diol, the poly(1,4-butylene oxide) glycol, or a combination thereof is derived from biomass.

26. The process of claim 25, wherein the biomass is selected from the group consisting of grains and cellulosic containing materials.

27. The composition of claim 1, wherein the polycarbonate comprises repeating polysiloxane units of the formula

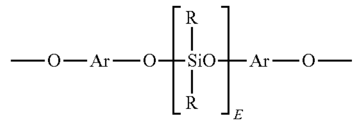

wherein each R is independently at each occurrence the same or different $C_{1-13}$ monovalent organic radical; each Ar is independently the same or different $C_{6-30}$ arylene group wherein the covalent bonds of the $C_{6-30}$ arylene group are directly connected to an aromatic moiety of the $C_{6-30}$ arylene group; and E is an integer having an average value of 2 to 1,000.

28. The composition of claim 1, wherein the copolyetherester elastomer has a reduced $CO_2$ emissions index of at least 1 kg.

* * * * *